(12) United States Patent
Iki

(10) Patent No.: US 7,206,043 B2
(45) Date of Patent: Apr. 17, 2007

(54) LIQUID CRYSTAL DISPLAY WITH IRREGULARLY SHAPED PIXEL ELECTRODE AND LIGHT-SHIELD WITH PROTRUSIONS OVERLAPPING SELECT CORNERS OF THE PIXEL ELECTRODE

(75) Inventor: Takunori Iki, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 10/842,565

(22) Filed: May 11, 2004

(65) Prior Publication Data

US 2005/0001945 A1   Jan. 6, 2005

(30) Foreign Application Priority Data

May 22, 2003 (JP) .............................. 2003-144510

(51) Int. Cl.
*G02F 1/1333* (2006.01)
(52) U.S. Cl. ...................................... 349/110; 349/146
(58) Field of Classification Search ........ 349/144–146, 349/110
See application file for complete search history.

(56) References Cited

U.S. PATENT DOCUMENTS 5,249,070 A * 9/1993 Takano ....................... 349/136
6,388,721 B1 * 5/2002 Murade ........................ 349/44
2002/0057403 A1 * 5/2002 Yasukawa et al. .......... 349/110
2002/0060756 A1 * 5/2002 Kurashina ..................... 349/39

FOREIGN PATENT DOCUMENTS

| JP | A 2001-305580 | 10/2001 |
| JP | A 2001-318388 | 11/2001 |
| JP | 2002-090721 | * 3/2002 |
| JP | A 2002-090721 | 3/2002 |
| JP | A 2003-075814 | 3/2003 |

* cited by examiner

*Primary Examiner*—Andrew Schechter
*Assistant Examiner*—Phu Vu
(74) *Attorney, Agent, or Firm*—Oliff & Berridge, PLC

(57) ABSTRACT

To display high quality images by preventing quality of images from deteriorating due to reverse tilt domains and reducing or preventing light leakage from being generated on images, an electro-optical device includes data lines, scanning lines, TFTs, and pixel electrodes on a substrate. Cutout portions are formed in parts of the pixel electrodes. First light-shielding films extend along at least one of the data lines and the scanning lines. Quadrangular portions formed of the same film as the first light-shielding films are formed in the first light-shielding films to reduce or prevent the light leakage due to the cutout portions.

14 Claims, 11 Drawing Sheets

LIQUID CRYSTAL DISPLAY WITH IRREGULARLY SHAPED PIXEL ELECTRODE AND LIGHT-SHIELD WITH PROTRUSIONS OVERLAPPING SELECT CORNERS OF THE PIXEL ELECTRODE

BACKGROUND OF THE INVENTION

1. Field of Invention

The present invention relates to an electro-optical device, such as an active-matrix driven liquid crystal display device, an electrophoresis device, such as an electronic paper, and an electroluminescent (EL) display device. The present invention also relates to an electronic apparatus and a projection display apparatus, such as a liquid crystal projector, each including such an electro-optical device.

2. Description of Related Art

Electro-optical devices capable of being driven by an active matrix apparatus are known in the related art. The electro-optical devices include pixel electrodes arranged on a substrate in a matrix with thin film transistors (TFT) connected to each pixel electrode, scanning lines and data lines connected to the TFTs and mounted parallel in the columns and rows.

In addition to the above structure, such electro-optical devices include a counter substrate that faces the substrate, a counter electrode that faces the pixel electrodes on the counter substrate, and a liquid crystal layer interposed between the pixel electrodes and the counter electrode so that images can be displayed. The alignment of liquid crystal molecules in the liquid crystal layer appropriately changes by a predetermined potential difference set between the pixel electrodes and the counter electrode so that the transmittance ratio of the light that passes through the liquid crystal layer changes. As a result, images are displayed.

Also, in such electro-optical devices, when potential is applied to the pixel electrodes, a driving method referred to as one H inversion driving, one S inversion driving, or dot inversion driving, may be adopted in order to reduce or prevent the deterioration in the liquid crystal layer. Here, the one H inversion driving is a driving method in which, among the pixel electrodes arranged in a matrix when the pixel electrodes in the nth row are driven by positive potential, the pixel electrodes in the next (n+1th) row are driven by negative potential, so that all of the pixel electrodes arranged in a matrix are driven by applying an electric field whose polarity is inverted every row. Therefore, between the rows of adjacent pixel electrodes, since the direction of the vertical electric field generated between the pixel electrode and the counter electrode is reverse, it is possible to reduce or prevent deterioration in the characteristics of the liquid crystal layer which would occur when the electric field is constantly applied in a uniform direction. Also, the one S inversion driving is a driving method in which the "column" is used as a unit, instead of the "row" being used as a unit as in the one H inversion driving. The dot inversion driving is a driving method in which the electric field whose polarity is inverted is applied to each pixel electrode.

However, according to such driving methods, a reverse tilt domain is generated in each pixel electrode and reverse tilt domains corresponding to adjacent pixel electrodes interact to deteriorate the quality of images. The reverse tilt domain refers to a region where the liquid crystal molecules arranged in a predetermined direction (that is, arranged at a predetermined pre-tilt angle) by an alignment film are arranged in a direction reverse thereto. This phenomenon occurs because an electric field whose polarity is inverted is applied to each pixel electrode to easily disturb the alignment of the liquid crystal molecules. Furthermore, the deterioration in the quality of images due to the reverse tilt domains is seen in the contrast ratio of images, or specifically, a phenomenon in which, when display of light gray-scales is seen in an image that should be entirely black, the portions displayed black before remain (in a worst case, black display may remain in a group of horizontal pixels).

Therefore, in the related art devices, in order to cope with such a problem, for example, as disclosed in Japanese Unexamined Patent Application Publication No. 2001-318388, an electro-optical device is provided where the distance between adjacent pixel electrodes and the physical distance between adjacent reverse tilt domains are increased by providing cutout portions in the respective pixel electrodes to reduce or prevent the deterioration in the quality of images.

SUMMARY OF THE INVENTION

However, the electro-optical device disclosed in Japanese Unexamined Patent Application Publication No. 2001-318388 has the following problems. When the distance between adjacent pixel electrodes is increased by providing cutout portions in the pixel electrodes, it is possible to reduce or prevent the deterioration in the quality of images. But light leakage occurs in the images due to the cutout portions. The causes and the mechanisms are not clear. However, since it is confirmed by the research of the inventor of the present invention that the light leakage does not occur in the device where the cutout portions are not provided, it is obvious that the cutout portions are the causes of the light leakage. It is also confirmed that the light leakage occurs in different manners according to the difference in the specific shapes of the cutout portions and whether the liquid crystal rotates to the right or left.

For example, when the pixel electrode is substantially rectangular in plan view, in a case where two adjacent corners are cut out in the rectangles, the light leakage occurs at the corners of the side that faces the side between the two corners. That is, when the cutout portions are formed on the "lower side," the light leakage occurs at the corners of the "upper side". When the cutout portions are formed on the "upper side," the light leakage occurs at the corners of the "lower side". As a result of the light leakage, even if the cutout portions are formed in the pixel electrodes to reduce or prevent the deterioration in the quality of images due to the reverse tilt domains, the quality of images deteriorates.

The present invention has been made in view of the above problems. The present invention provides an electro-optical device capable of reducing or preventing the deterioration of images due to the reverse tilt domains and of reducing or preventing the light leakage, thereby displaying high quality images, and an electronic apparatus and a projection display apparatus including the electro-optical device.

In order to address the above problems, an aspect of the present invention provides a first electro-optical device including, on a substrate, data lines that extend in a certain direction and scanning lines that extend orthogonal to the data lines, switching elements to which scanning signals are supplied by the scanning lines, pixel electrodes to which image signals are supplied by the data lines through the switching elements, cutout portions formed by cutting out parts of the pixel electrodes, first light-shielding films that extend along at least one of the data lines and the scanning lines, and second light-shielding films made of the same film as the first light-shielding films to reduce or prevent light leakage from occurring due to the cutout portions.

According to the first electro-optical device of an aspect of the present invention, the scanning signals are supplied to the thin film transistors that control the switching elements through the scanning lines so that the switching on or off of the electro-optical device is controlled. The image signals are supplied to the pixel electrodes through the data lines. Therefore, the image signals are applied or are not applied to the pixel electrodes corresponding to the switching on or off of the thin film transistors. As a result, the electro-optical device according to an aspect of the present invention is active matrix driven.

Also, in an aspect of the present invention, in particular, the pixel electrodes include the cutout portions. Therefore, when the pixel electrodes are arranged, it is possible to separate adjacent pixel electrodes by the distance of the cutout portions and to increase the physical distance between adjacent reverse tilt domains, each being generated in each of the pixel electrodes. This reduces or prevents the occurrence of the interaction among the reverse tilt domains and reduces or prevents the deterioration in the quality of images. Also, since the distance between adjacent pixel electrodes in the part where the cutout portions are not formed can be maintained as it was, it is possible to display images without deteriorating their brightness compared with the related art devices and without narrowing the region where the pixel electrodes are formed, which serves as a light-transmitting region.

In an aspect of the present invention, first light-shielding films that extend along at least one of the data lines and the scanning lines are provided. Second light-shielding films made of the same film as the first light-shielding films, the second light-shielding films are provided to reduce or prevent the light leakage due to the cutout portions. Again, the reason why the light leakage caused by the "cutout portions" occurs is not clear as described above. However, according to an aspect of the present invention, since it is possible to block the light leakage with the second light-shielding films, it is possible to reduce or prevent the light from being mixed with images.

Therefore, according to an aspect of the present invention, it is possible to reduce or prevent the deterioration of images due to the reverse tilt domains and due to the light leakage caused by the cutout portions beforehand.

Also, in an aspect of the present invention, that the first and second light-shielding films are "made of the same film" means that, in the processes of manufacturing the electro-optical device, the precursor films of the first and second light-shielding films are formed in the same process, and that a predetermined patterning process such as photolithography and etching, is simultaneously performed on the precursor films. Also, in the first and second light-shielding films, the former may be formed as a part of the latter or the latter may be formed as a part of the former. That is, an aspect in which the first light-shielding films (or the second light-shielding films) are not separated from the second light-shielding films (or the first light-shielding films) in the patterning and both of them are continuously formed in plan view is included in the scope of the present invention. In short, that the first and second light-shielding films are "made of the same film" means that the first and second light-shielding films are formed in the same process as mentioned above and that both of them may be separated from each other in the patterning and may be continuously formed.

In order to address the above problems, an aspect of the present invention provides a second electro-optical device including, on a substrate, data lines that extend in a certain direction and scanning lines that extend orthogonal to the data lines, switching elements to which scanning signals are supplied by the scanning lines, pixel electrodes having rectangles in plan view and to which image signals are supplied by the data lines through the switching elements, cutout portions formed by cutting out corners of the rectangles in the pixel electrodes, first light-shielding films that extend along at least one of the data lines and the scanning lines, and second light-shielding films made of the same film as the first light-shielding films so as to correspond to at least one corner of the rectangles of the pixel electrodes.

The second electro-optical device of an aspect of the present invention can be active matrix driven as in the first electro-optical device.

In an aspect of the present invention, in particular, the pixel electrode is rectangular in plan view and the corners of the rectangle are cut out. Therefore, when the pixel electrodes are arranged, it is possible to separate adjacent pixel electrodes by the distance of the cutout portions and to increase the physical distance between the reverse tilt domains, each being generated in each of the pixel electrodes. Therefore, since it is possible to reduce or prevent the interactions among the reverse tilt domains, it is possible to reduce or prevent the deterioration in the quality of images. Also, since the distance between adjacent pixel electrodes in the portion where the cutout portions are not formed can be maintained as it was, it is possible to display images having brightness equal to related art displays without narrowing the region where the pixel electrodes are formed, which serves as a light-transmitting region.

In an aspect of the present invention, the first light-shielding films that extend along at least one of the data lines and the scanning lines is provided. Also, the second light-shielding films made of the same film as the first light-shielding films and arranged so as to correspond to at least one corner of the rectangle of the pixel electrode are provided. Here, the reason why the light leakage caused by the "cutout portions" occurs is not clear as described above. However, according to the research of the inventor of the present invention, as in an aspect of the present invention, when the pixel electrode is rectangular in plan view and the "corners" of the rectangle are cut out, it is noted that the light leakage is likely to correspond to "at least one corner" of the rectangle. The "at least one corner" mentioned here includes the other corners that constitute the rectangle as well as the corners in which the cutout portions are formed. In an aspect of the present invention, the second light-shielding films to block the light are formed so as to correspond to the "at least one corner".

Therefore, according to an aspect of the present invention, it is possible to reduce or prevent the deterioration of images due to the reverse tilt domains as mentioned above and to reduce or prevent the deterioration of images due to the light leakage caused by the cutout portions beforehand.

Also, in an aspect of the present invention, that the first and second light-shielding films are "formed of the same film" has benefits as already mentioned.

Also, that the pixel electrode is "rectangular" in plan view means that the pixel electrode is square and rectangular in plan view and that the shape of pixel electrode is obtained by slightly modifying the square and the rectangle in plan view.

In an aspect of the first or second electro-optical device according to the present invention, the cutout portions are formed so as to cut out at least one of the two corners that define any one side of the rectangles. Each of the second light-shielding films is formed so as to correspond to any one of the two corners that define the side that faces the above-mentioned one side.

According to this aspect, it is possible to reduce or prevent the light leakage due to the cutout portions. That is, according to the research of the inventor of the present invention, for example, when the pixel electrode is rectangular in plan view, in a case where the cutout portions are formed so as to cut out two corners that define one short side in the rectangle, it is noted that the light leakage is likely to occur in any one of the two corners that define the short side that faces the short side. However, according to the present aspect, the second light-shielding films are formed so as to correspond to any one of the two corners. As mentioned above, in the present aspect, the second light-shielding films are provided in portions where the light leakage is likely to occur. Therefore, it is possible to reduce or prevent the deterioration in the quality of images.

In another aspect of the electro-optical device according to the present invention, the first light-shielding films are formed as a matrix in plan view along both the scanning lines and the data lines. The pixel electrodes are arranged in a matrix so as to exclude the formed as a matrix shapes. The second light-shielding films are formed so as to correspond to the corners of the intersections of the formed as a matrix shapes.

According to this aspect, the first light-shielding films are formed in a lattice along both the scanning lines and the data lines. The pixel electrodes are arranged in a matrix so as to exclude the formed as a matrix shape to function as light-shielding films to separate adjacent pixels from each other. Therefore, it is possible to obtain high contrast images.

The second light-shielding films are formed to correspond to the corners of the respective intersections in the formed as a matrix shape. Therefore, the second light-shielding films cover only the corners of the respective pixel electrodes. Therefore, in general, the second light-shielding films do not randomly cover the regions where the pixel electrodes are formed, which serve as the light-transmitting regions, over a wide area. Therefore, compared with the related art devices, it is possible to reduce or prevent the light leakage without sacrificing the brightness of images.

Also, as mentioned above, when the pixel electrode is rectangular in plan view and the cutout portions are formed so as to cut out the corners of the rectangle, the light leakage is likely to occur around the "corners" according to the present aspect. Therefore, according to the present aspect, in such a case, it is possible to reduce or prevent the deterioration of images due to the cutout portions.

Also, in the present aspect, that the pixel electrodes are formed "so as to exclude the formed as a matrix shapes" does not only mean that the first light-shielding films and the pixel electrodes are formed without overlapping each other completely in plan view. For example, any one side of each pixel electrode may partially overlap the first light-shielding films. In such a case, it is considered that the pixel electrodes are formed "so as to exclude the formed as a matrix shape".

In this aspect, the second light-shielding film may be formed so as to correspond to one corner of the intersections. The first light-shielding films may be formed of the same film as the second light-shielding films. Third light-shielding films may be further provided so as to correspond to at least one of the three corners excluding the one corner among the intersections.

According to such a structure, third light-shielding films are formed so as to correspond to at least one of the three corners excluding the corners corresponding to the second light-shielding films among the four corners that are the intersections between the first light-shielding film and the third light-shielding film, which form the formed as a matrix shape.

Therefore, first, even if the light leakage caused by the cutout portions occurs in unexpected portions, it is possible to reduce or prevent the occurrence of the light leakage by the third light-shielding films beforehand.

Also, according to such third light-shielding films, when the switching elements are formed of, for example, the thin film transistors, it is possible to reduce or prevent light from being incident on a semiconductor layer (an active layer). Therefore, it is possible to reduce or prevent the generation of light leakage current in the semiconductor layer and to reduce or prevent flickering on the images.

The light leakage current is more effective when "the switching elements are arranged so as to correspond to the intersections in the formed as a matrix shape". This is because the light that passes through the vicinity of the corners of the intersections is easily incident on the semiconductor layer.

In this aspect, the third light-shielding films may be formed so as to cover the cutout portions.

According to such a structure, it is possible to block the light that passes through the cutout portions, that is, the light that passes through the portions in which the pixel electrodes are not formed.

In another aspect of the electro-optical device according to the present invention, the electro-optical device may include a counter substrate that faces the substrate and twisted nematic liquid crystal sealed between the substrate and the counter substrate. The positions at which the second light-shielding films are formed are determined by the directions in which the twisted nematic liquid crystal rotates.

According to this aspect, it is possible to reduce or prevent the light leakage due to the cutout portions by determining the positions at which the second light-shielding films are formed so as to correspond to the direction in which the TN liquid crystal rotates. According to the research of the inventor of the present invention, even if the cutout portions are formed in the same position, the portion in which the light leakage occurs varies with the direction in which TN liquid crystal rotates. Specifically, as mentioned above, when the pixel electrode is rectangular in plan view, in the case where the cutout portions are formed so as to cut out the two corners that define one short side in the rectangle, it is noted that the light leakage is likely to occur in any one of the two corners that define the short side that faces the short side. In this case, for example, when the TN liquid crystal rotates to the left, it is noted that the light leakage occurs in one of the two corners. When the TN liquid crystal rotates to the right, it is noted that the light leakage occurs in the other corner.

As mentioned above, the portion in which the light leakage occurs varies with the direction in which the TN liquid crystal rotates. However, in the present aspect, since the second light-shielding films are formed in correspondence with the points in which the light leakage occurs, it is possible to reduce or prevent the occurrence of the light leakage.

In another aspect of the electro-optical device according to the present invention, the first light-shielding films are arranged between the data lines and the pixel electrodes so that the first light-shielding films have fixed potential.

According to this aspect, it is possible to reduce or prevent capacitive coupling from occurring between the data lines and the pixel electrodes. Therefore, it is possible to display higher quality images without generating color phase irregularity along the data lines. Also, in the present aspect, since the first light-shielding films to reduce or prevent the capacitive coupling, it is possible to simplify the structure of the electro-optical device and to reduce costs compared with a case in which the first light-shielding films and the films to prevent the capacitive coupling are separately formed.

Also, in order to more effectively obtain such effects, the first light-shielding film may be formed so as to cover each data line and so that the width of the first light-shielding films is larger than the width of each data line. By doing so, it is possible to shield the data lines from the pixel electrodes.

In another aspect of the electro-optical device according to the present invention, the electro-optical device may include storage capacitors on the substrate, each including pixel potential electrodes electrically connected to the switching elements and the pixel electrodes, fixed potential electrodes arranged so as to face the pixel potential electrodes, and dielectric films arranged between the pixel potential electrodes and the fixed potential electrodes. The first light-shielding films supply fixed potential to the fixed potential electrodes.

According to this aspect, first, since storage capacitors are provided, it is possible to enhance the ability to maintain the potential of the pixel electrodes. Therefore, it is possible to enhance the contrast ratio of images.

Also, according to the present aspect, the first light-shielding films function as wiring lines to supply fixed potential to fixed potential electrodes that are one of the electrodes that constitute the storage capacitors. Therefore, compared with the case in which the first light-shielding films and the wiring lines to supply the fixed potential to the fixed potential electrodes are separately formed, it is possible to simplify the structure of the electro-optical device and to reduce costs.

Also, when the first light-shielding films that meet the conditions described in the present aspect are arranged between the data lines and the pixel electrodes, the first light-shielding films can also reduce or prevent the capacitive coupling mentioned above to enhance the performances of the first light-shielding films. Therefore, it is possible to simplify the structure of the electro-optical device and to reduce costs with more efficiency.

In another aspect of the electro-optical device according to the present invention, each of the first light-shielding films has a laminated structure.

According to this aspect, since each of the first light-shielding films has a laminated structure, the second light-shielding film or the third light-shielding film, which is made of the same film as the first light-shielding film, may have the same laminated structure. When the laminated structure is a two-layered structure made of a light-reflecting material and a light-absorbing material, for example, the first, second, or third light-shielding film has an excellent light-shielding performance. Therefore, it is possible to reduce or prevent the occurrence of the light leakage by the second light-shielding films and to separate the pixel electrodes from each other by the first light-shielding films with more efficiency.

Also, when the first light-shielding film has the laminated structure, in order to conceive a specific structure, purposes other than enhancing the light-shielding performance may be considered. For example, when the first light-shielding films function as the wiring lines to supply the fixed potential to the fixed potential electrodes of the storage capacitors as mentioned above, the first light-shielding film desirably has a low resistance. Therefore, a first layer of the laminated structure may be made of a material (for example, aluminum) having a low electric resistance.

The light reflective material is, for example, an aluminum film having a relatively superior light-reflecting performance. The light-absorbing material is, for example, a titan or titan nitride film having a relatively superior light-absorbing performance.

An electronic apparatus according to an aspect of the present invention includes the above-mentioned electro-optical device (including various aspects) in order to address the problems.

Since electronic apparatus according to an aspect of the present invention include the above-mentioned electro-optical devices according to an aspect of the present invention, it is possible to realize various electronic apparatus, such as liquid crystal TVs, mobile telephones, electronic notes, word processors, view finder type or monitor direct-view type video tape recorders, workstations, picture telephones, POS terminals, or touch panels capable of displaying high quality images without the deterioration in the quality of images due to the reverse tilt domains and the light leakage caused by the cutout portions of the pixel electrodes.

In order to address the problems, a projection display apparatus according to an aspect of the present invention includes the above-mentioned electro-optical device (including the various aspects), a light source, an optical system to guide projection light emitted from the light source to the electro-optical device, and a projection optical system to project the projection light emitted from the electro-optical device.

Since the projection display apparatus according to an aspect of the present invention include the above-mentioned electro-optical device according to an aspect of the present invention, it is possible to create a projection display apparatus capable of displaying high quality images without the deterioration in the quality of images due to the reverse tilt domains and the light leakage caused by the cutout portions of the pixel electrodes. In the projection display apparatus of an aspect of the present invention, in particular, light sources with intense light are used in many cases. In this case, since the degree of the light leakage caused by the cutout portions of the pixel electrodes becomes more severe (for example, the intensity of light increased due to the light leakage), it is more advantageous to include the above-mentioned electro-optical devices according to an aspect of the present invention.

The operation and other advantages of the present invention will become apparent by the following exemplary embodiments.

DETAILED DESCRIPTION OF EXEMPLARY EMBODIMENTS

Exemplary embodiments of the present invention will now be described with reference to the drawings. According to the following exemplary embodiments, the electro-optical devices according to the present invention are applied to liquid crystal devices.

Structure of Electro-Optical Device

Figure 1:
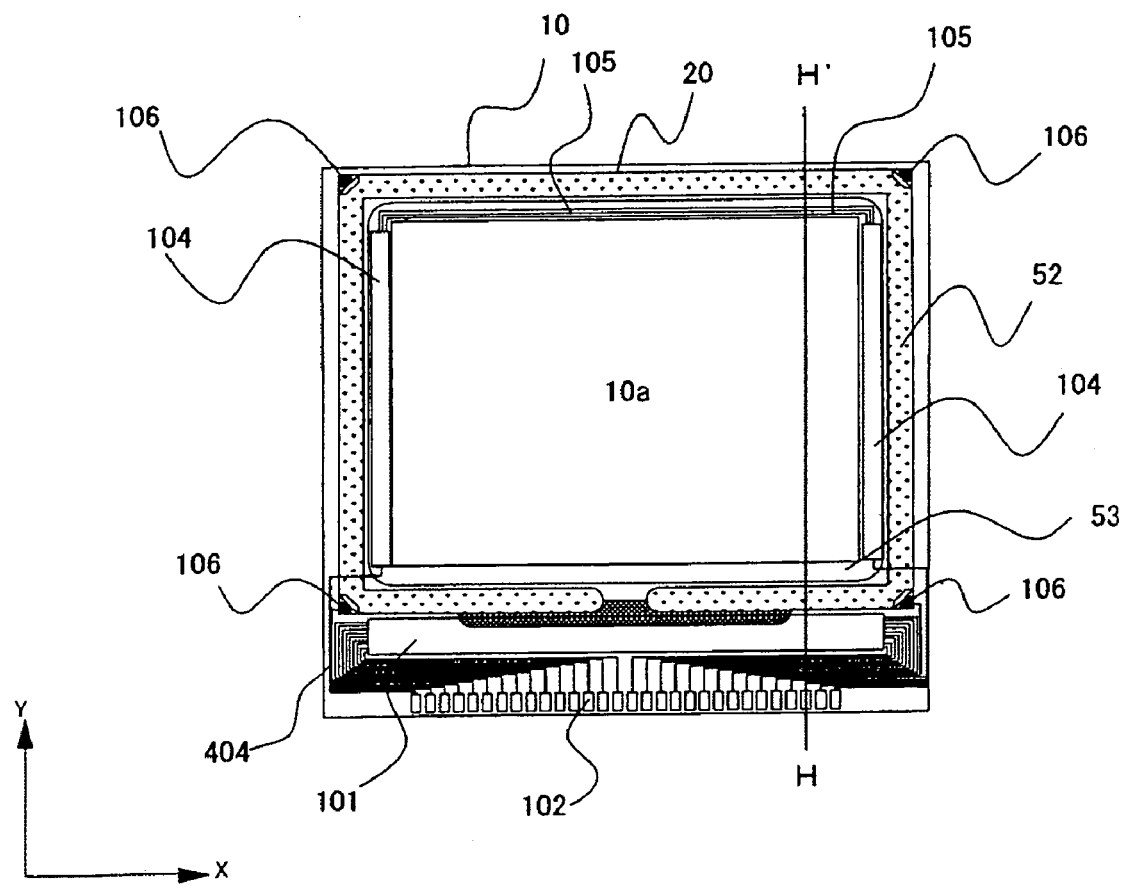
FIG. 1 is a schematic of an electro-optical device according to an aspect of the present invention, in which a TFT array substrate is seen from a counter substrate together with various components formed thereon.
Figure 2:
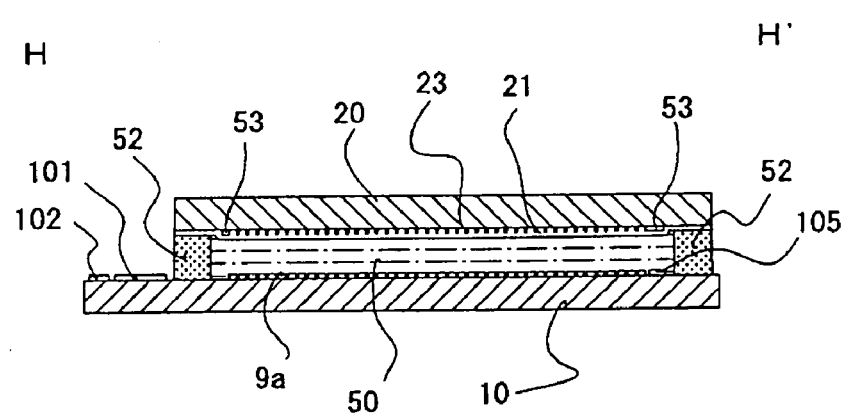
FIG. 2 is a schematic view taken along the plane H–H' of FIG. 1.

First, the structure of the electro-optical device according to an exemplary embodiment of the present invention will now be described with reference to FIGS. 1 and 2. Here, FIG. 1 is a schematic of an electro-optical device, in which a TFT array substrate is seen from a counter substrate side together with the respective components formed on the TFT array substrate. FIG. 2 is a sectional schematic taken along the plane H–H' in FIG. 1. Here, a liquid crystal device of a TFT active matrix driving method in which a driving circuit is built in will be taken as an example of the electro-optical device.

In FIGS. 1 and 2, in the electro-optical device according to the present exemplary embodiment, a TFT array substrate 10 and a counter substrate 20 face each other. A liquid crystal layer 50 is sealed between the TFT array substrate 10 and the counter substrate 20. The TFT array substrate 10 and the counter substrate 20 are bonded to each other by a sealing material 52 provided in a sealing region around an image display region 10a.

The sealing material 52 is made of an ultraviolet curable resin and a thermosetting resin in order to affix the two substrates to each other. The sealing material 52 is applied to the TFT array substrate 10, and is cured by UV irradiation, heating, etc., during the manufacturing processes. Also, a gap material, such as glass fibers or glass beads, is scattered in the sealing material 52 so that the distance between the TFT array substrate 10 and the counter substrate 20 (a gap between the substrates) has a predetermined value. The electro-optical device according to the present exemplary embodiment for a light valve of a projector is small and is suitable for an enlarged display.

A frame light-shielding film 53 of a light-shielding performance, which defines the frame region of the image display region 10a, is provided on the counter substrate 20 side parallel to the inside of the sealing region where the sealing material 52 is arranged. A part or all of the frame light-shielding film 53 may be provided as the first light-shielding film built in the TFT array substrate 10. Also, in the present exemplary embodiment, there is a peripheral region around the image display region 10a. That is, in the present exemplary embodiment, in particular, as seen from the center of the TFT array substrate 10, the portion beyond the frame light-shielding film 53 is defined as the peripheral region.

In the region of the peripheral region which is positioned outside the sealing region where the sealing material 52 is arranged, a data line driving circuit 101 and an external circuit connection terminal 102 are provided along one side of the TFT array substrate 10. Also, scanning line driving circuits 104 are placed along the two sides adjacent to the one side so as to be covered with the frame light-shielding film 53. Furthermore, in order to connect the two scanning line driving circuits 104 provided on both sides of the image display region 10a to each other, a plurality of wiring lines 105 are provided along the remaining one side of the TFT array substrate 10 and are covered with the frame light-shielding film 53.

Also, up-and-down conducting materials 106 that function as up-and-down conducting terminals between the two substrates are arranged in the four corners of the counter substrate 20. Up-and-down conducting terminals are provided in the TFT array substrate 10 in the regions that face the corners. Therefore, it is possible to perform electric conduction between the TFT array substrate 10 and the counter substrate 20.

In FIG. 2, an alignment film is formed on the TFT array substrate 10 on a pixel electrode 9a where wiring lines, such as TFTs used as pixel switches, scanning lines, and data lines are formed. Other than the counter electrode 21, a first light-shielding film 23 formed as a matrix or striped is formed on the counter substrate 20. An alignment film is formed on the uppermost layer portion. Also, the liquid crystal layer 50 is made of liquid crystals obtained by mixing one kind or various kinds of twisted nematic (TN) liquid crystals and is in a predetermined alignment state between the pair of alignment films.

Also, sampling circuits on image signal lines to sample image signals and supply the sampled image signals to the data lines, precharge circuits to supply a predetermined voltage level of precharge signals to the plurality of data lines prior to the image signals, and test circuits to test the quality and the defect of the electro-optical devices during manufacturing or forwarding may be formed on the TFT array substrate 10 illustrated in FIGS. 1 and 2 in addition to the data line driving circuits 101 and the scanning line driving circuits 104.

Structure of Pixel Portion

Figure 3:
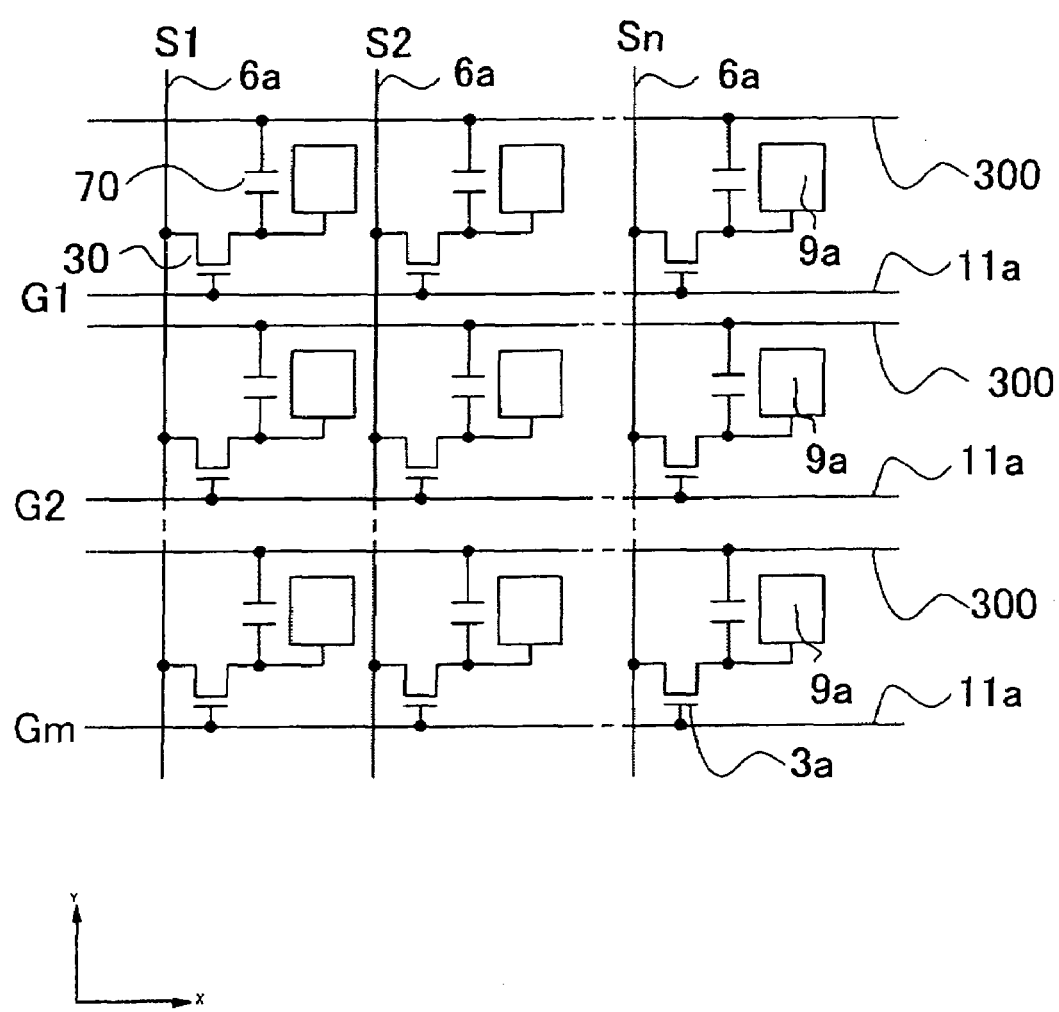
FIG. 3 is a schematic of equivalent circuits, such as various elements and wiring lines in a plurality of pixels in a matrix, which constitute the image display region of the electro-optical device.
Figure 4:
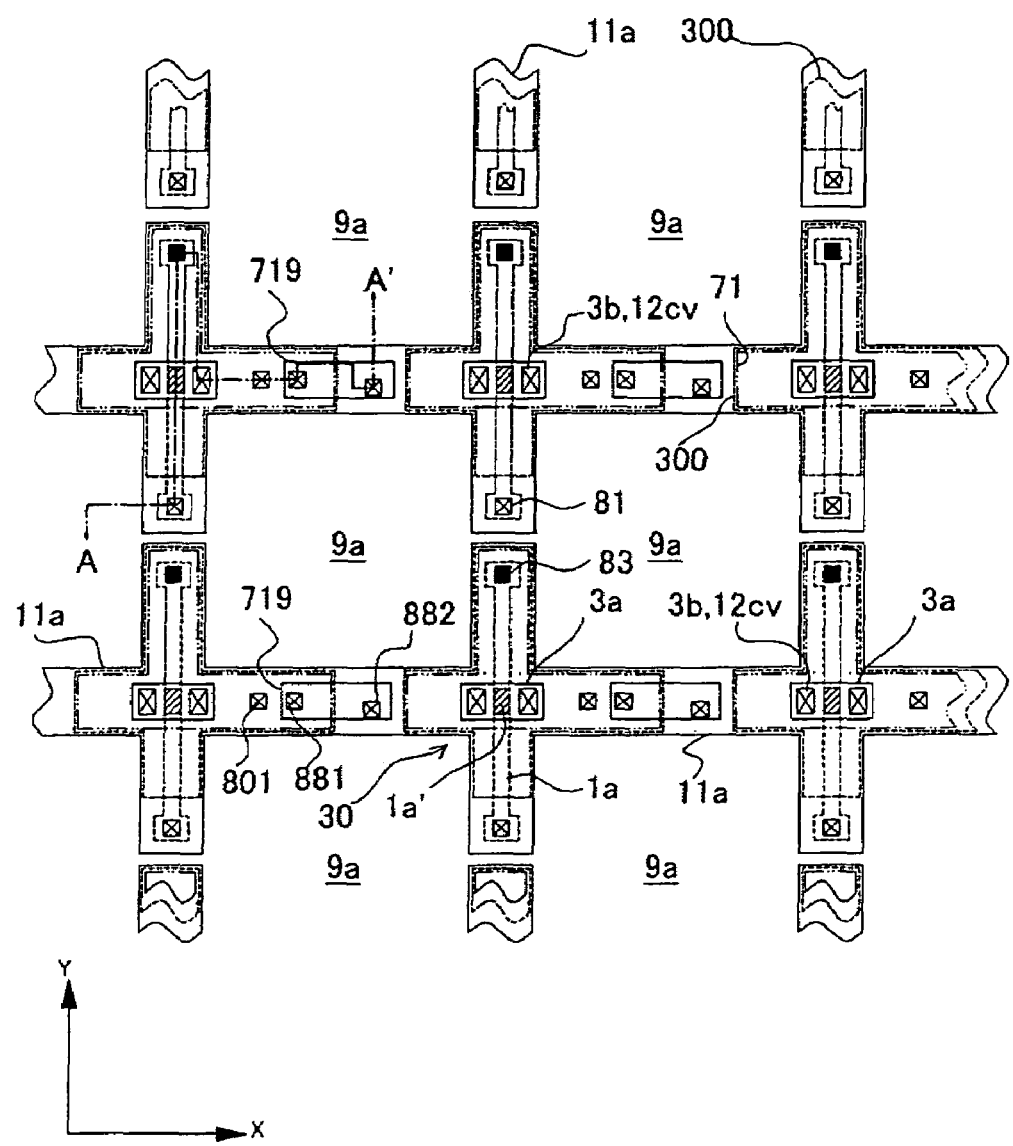
FIG. 4 is a schematic of the structure of a lower layer (the lower layer from the bottom to the reference numeral 70 (the storage capacitor) in FIG. 6) a plurality of adjacent pixels on the TFT array substrate on which data lines, scanning lines, and pixel electrodes are formed.
Figure 5:
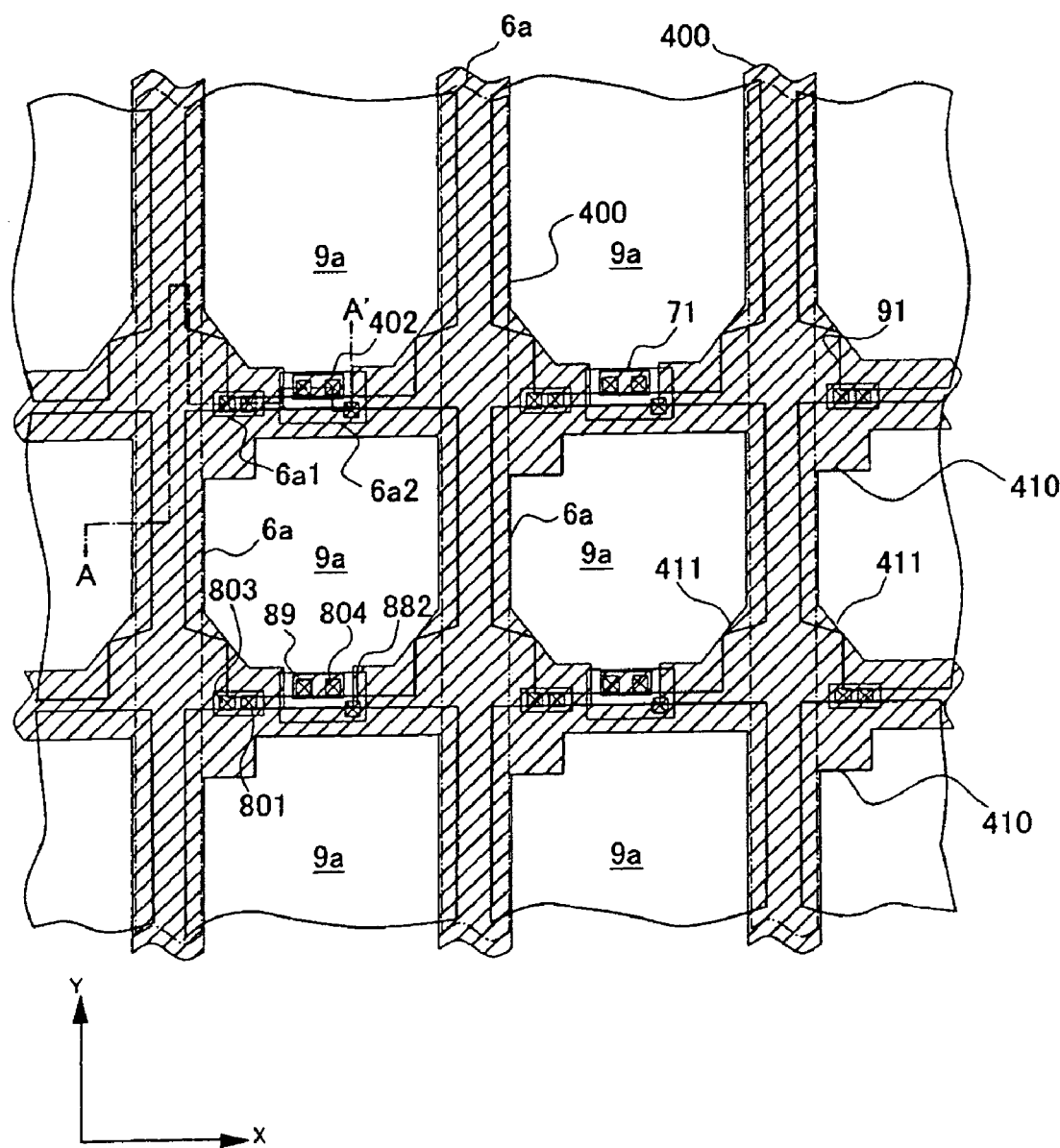
FIG. 5 is a schematic of only the structure of an upper layer (the upper layer from above the reference numeral 70 (the storage capacitor) to the top in FIG. 6) of the plurality of adjacent pixels on the TFT array substrate on which the data lines, the scanning lines, and the pixel electrodes are formed.

The structure of the pixel portion of the electro-optical device according to the present exemplary embodiment of the present invention will now be described with reference to FIGS. 3 to 6. Here, FIG. 3 illustrates an equivalent circuit composed of various elements and wiring lines in the plurality of pixels formed in a matrix, which constitute the image display region of the electro-optical device. FIGS. 4 and 5 are schematics of a plurality of pixel groups adjacent to each other on the TFT array substrate where the data lines, the scanning lines, and the pixel electrodes are formed. Also, FIGS. 4 and 5 illustrate the lower layer portion (FIG. 4) and the upper layer portion (FIG. 5) among the laminated structure which will be described later.

Figure 6:
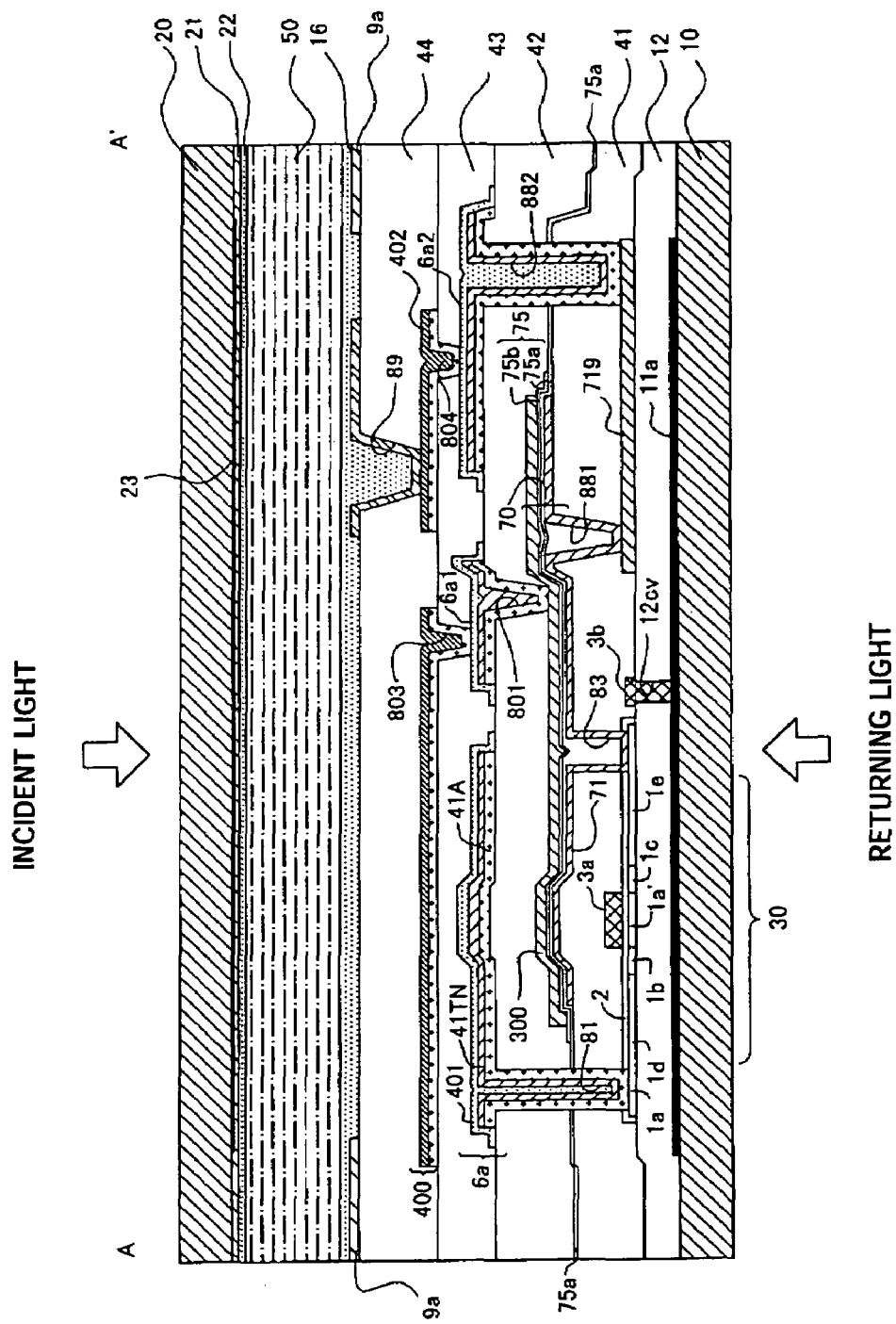
FIG. 6 is a sectional schematic taken along the plane A–A' when FIG. 4 overlaps FIG. 5.

FIG. 6 is a sectional schematic taken along the plane A–A' when FIGS. 4 and 5 overlap. Also, in FIG. 6, the scales of respective layers and members are different from each other so that the layers and members can be recognized in the drawing.

Circuit Structure of Pixel Portion

In FIG. 3, in a plurality of pixels in a matrix, which constitute the image display region of the electro-optical device according to an aspect of the present invention, pixel electrodes 9a and TFTs 30 to control switching of the pixel electrodes 9a are formed. Data lines 6a, to which image signals, are supplied are electrically connected to the sources of the TFTs 30. The image signals S1, S2, ..., and Sn, written in the data lines 6a, may be line-sequentially supplied in order or may be supplied to the plurality of adjacent data lines 6a by groups.

Gate electrodes 3a are electrically connected to the gates of the TFTs 30. Scanning signals G1, G2, ..., and Gm are linear sequentially applied to scanning lines 11a and the gate electrodes 3a in pulse in this order at predetermined timing. The pixel electrodes 9a are electrically connected to the drains of the TFTs 30 and switch off the TFTs 30 that are switching elements for a certain period of time to write the image signals S1, S2, ..., and Sn supplied from the data lines 6a at predetermined time.

A predetermined level of image signals S1, S2, ..., and Sn, which are written in liquid crystal that is an example of an electro-optical material through the pixel electrodes 9a, are stored between the counter electrodes formed on the counter substrate for a certain period of time. The liquid crystal modulates light by changing the alignment or the order of molecule sets by an applied voltage level to allow grayshade. In a normally white mode, the transmittance ratio of incident light is reduced corresponding to a voltage applied to each pixel. In a normally black mode, the transmittance ratio of incident light increases corresponding to the voltage applied to each pixel. Therefore, light components having contrasts corresponding to the image signals are emitted from the electro-optical device.

Here, in order to reduce or prevent the stored image signals from leaking, storage capacitors 70 are added in parallel with liquid crystal capacitors formed between the pixel electrodes 9a and the counter electrode. The storage capacitors 70 are provided parallel to the scanning lines 11a and include capacitance electrodes of the fixed potential and the capacitance electrodes 300 fixed to controlled potential.

Detailed Structure of Pixel Portion

The detailed structure of the electro-optical device in which the above-mentioned circuit is realized by the data lines 6a, the scanning lines 11a, the gate electrodes 3a, and the TFTs 30 will now be described with reference to FIGS. 4 to 6.

First, in FIG. 5, the plurality of pixel electrodes 9a (whose outlines are marked with solid lines) is provided on the TFT array substrate 10 in a matrix. The data lines 6a and the scanning lines 1a are provided along the vertical and horizontal boundaries of the pixel electrodes 9a. The data lines 6a have a laminated structure including an aluminum film, as mentioned later. The scanning lines 11a are made of, for example, a conductive polysilicon film. Also, the scanning lines 11a are electrically connected to the gate electrodes 3a that face channel regions 1a', marked with oblique lines which are upwardly slanted to the right in the drawing, in semiconductor layers 1a through contact holes 12cv. The gate electrodes 3a are included in the scanning lines 11a. The pixel switching TFTs 30 in which the gate electrodes 3a included in the scanning lines 11a are provided in the channel regions 1a' in the intersections between the gate electrodes 3a and the data lines 6a. Therefore, there are the TFTs 30 (excluding the gate electrodes) between the gate electrodes 3a and the scanning lines 11a.

Next, as illustrated in FIG. 6 that is a sectional schematic taken along the plane A–A' of FIG. 5, the electro-optical device includes the TFT array substrate 10 made of, for example, a quartz substrate, a glass substrate, or a silicon substrate and the counter substrate 20 made of, for example, the glass substrate or the quartz substrate and arranged to face the TFT array substrate 10.

As illustrated in FIG. 6, the pixel electrodes 9a are provided on the TFT array substrate 10 side. An alignment film 16 on which a predetermined alignment process, such as a rubbing process, is performed is provided on the pixel electrodes 9a. The pixel electrodes 9a are made of, for example, a transparent conductive film, such as an ITO film. A counter electrode 21 is provided all over the surface on the counter substrate 20 side. An alignment film 22 on which a predetermined alignment process, such as a rubbing process, is performed is provided under the counter electrode 21. The counter electrode 21, as in the pixel electrodes 9a, is made of the transparent conductive film, such as an ITO film.

As mentioned above, between the TFT array substrate 10 and the counter substrate 20 that are arranged to face each other, an electro-optical material, such as liquid crystal is sealed in the space surrounded by the sealing material 52 (refer to FIGS. 1 and 2) to form the liquid crystal layer 50. The liquid crystal layer 50 is in a predetermined alignment state by the alignment films 16 and 22 in a state where an electric filed is not applied from the pixel electrodes 9a.

On the TFT array substrate 10, excluding the pixel electrodes 9a and the alignment films 16, various structures including the pixel electrodes 9a and the alignment films 16 are included to form a laminated structure. As illustrated in FIG. 6, the laminated structure is composed of a first layer including the scanning lines 11a, a second layer including the TFTs 30 including the gate electrodes 3a, a third layer including the storage capacitors 70, a fourth layer including the data lines 6a, a fifth layer including the capacitance wiring lines 400 (an example of the "first light-shielding film" according to an aspect of the present invention), and a sixth layer (the uppermost layer) including the pixel electrodes 9a and the alignment film 16. Also, a base insulating film 12 is provided between the first layer and the second layer. A first interlayer insulating film 41 is provided between the second layer and the third layer. The second interlayer insulating film 42 is provided between the third layer and the fourth layer. A third interlayer insulating film 43 is provided between the fourth layer and the fifth layer. A fourth interlayer insulating film 44 is provided between the fifth layer and the sixth layer to reduce the likelihood or prevent the above-mentioned components from being short-circuited. Also, in the insulating films 12, 41, 42, 43, and 44, for example, contact holes to electrically connect high-concentration source regions 1*d* in the semiconductor layers 1*a* of the TFTs 30 to the data lines 6*a* are formed. Hereinafter, the respective components will be described in the order from the bottom. Also, among the above, the first layer to the third layer are illustrated in FIG. 4 as a lower layer portion and the fourth layer to the sixth layer are illustrated in FIG. 5 as an upper layer portion.

Laminated Structure: Structure of First Layer

First, the scanning lines 11*a* composed of a metallic element including at least one among refractory metals, such as Ti, Cr, W, Ta, and Mo, an alloy, metal silicide, polysilicide, result from laminating the above, or a conductive polysilicon are provided in the first layer. The scanning lines 11*a* are patterned in strips along the direction X of FIG. 4 in plan view. Specifically, the scanning lines 11*a* in strips include main lines that extend along the direction X of FIG. 4 and protrusions that extend to the direction Y of FIG. 4 in which the data lines 6*a* or the capacitance wiring lines 400 extend. The protrusions that extend from the adjacent scanning lines 11*a* are not connected to each other. The scanning lines 11*a* are separated from each other by lines.

Laminated Structure: Structure of Second Layer

Next, the TFTs 30 including the gate electrodes 3*a* are provided as the second layer. As illustrated in FIG. 6, the TFTs 30 have a lightly doped drain (LDD) structure and include the gate electrodes 3*a*, the channel regions 1*a*' of the semiconductor layers 1*a*, which are made of, for example, a polysilicon film and in which channels are formed by the electric fields from the gate electrodes 3*a*, insulating films 2 including gate insulating films, and low-concentration source regions 1*b*, low-concentration drain regions 1*c*, high-concentration source regions 1*d* and high-concentration drain regions 1*e* in the semiconductor layers 1*a*.

Also, according to the present exemplary embodiment, relay electrodes 719 are made of the same film as the gate electrodes 3*a* in the second layer. As illustrated in FIG. 4, the relay electrodes 719 are isolated so as to be substantially in the middle of the sides that extend to the direction X of the pixel electrodes 9*a* in plan view. Since the relay electrodes 719 and the gate electrodes 3*a* are made of the same film, when the gate electrodes 3*a* are made of, for example, a conductive polysilicon film, the relay electrodes 719 are also made of the conductive polysilicon film.

As illustrated in FIG. 6, the TFTs 30 may have the LDD structure. However, they may have an offset structure in which impurities are not implanted into the low-concentration source regions 1*b* and the low-concentration drain regions 1*c*. Also, the TFTs 30 may be self-aligned TFTs in which high-concentration impurities are implanted using the gate electrodes 3*a* as masks and high-concentration source regions and drain regions are formed by self-alignment.

Laminated Structure: Structure between First Layer and Second Layer

Base insulating films 12 made of, for example, a silicon oxide film are provided on the scanning lines 11*a* and under the TFTs 30. The base insulating films 12 insulate the TFTs 30 from the scanning lines 11*a* and are formed on the entire surface of the TFT array substrate 10 to reduce or prevent the changes in the characteristics of the pixel switching TFTs 30 due to roughness caused by abrading the surface of the TFT array substrate 10 and the dirt that remains after cleaning the TFT array substrate 10.

In the base insulating films 12, grooved contact holes 12*cv* are formed along the direction of the lengths of the channels of the semiconductor layers 1*a* that extend along the later-mentioned data lines 6*a* at both sides of the semiconductor layers 1*a* in plan view. The gate electrodes 3*a* laminated on the contact holes 12*cv* have concave portions underneath. Also, the gate electrodes 3*a* are formed to fill all the contact holes 12*cv* so that side walls 3*b* integrally formed with the gate electrodes 3*a* extend from the gate electrodes 3*a*. Therefore, as illustrated in FIG. 4, the semiconductor layers 1*a* are covered from the sides in plan view and it is possible to reduce or prevent light from being incident at least from the semiconductor layers 1*a*.

The side walls 3*b* are formed so as to fill the contact holes 12*cv* and so that the lower ends thereof contact the scanning lines 11*a*. Here, as mentioned above, since the scanning lines 11*a* are in strips, the gate electrode 3*a* and the scanning line 11*a* in each row always have the same potential as those in the corresponding row.

Laminated Structure: Structure of Third Layer

The storage capacitors 70 are provided in the third layer following the second layer. The storage capacitors 70 are formed so that lower electrodes 71 as pixel potential side capacitance electrodes connected to the high-concentration drain regions 1*e* of the TFTs 30 and the pixel electrodes 9*a* and capacitance electrodes 300 as fixed potential side capacitance electrodes face each other with dielectric films 75 interposed. According to the storage capacitors 70, it is possible to enhance the potential holding characteristics of the pixel electrodes 9*a*. As can be seen from FIG. 4 in plan view, since the storage capacitors 70 according to the present exemplary embodiment are formed so as not to reach the light-transmitting regions almost corresponding to the regions where the pixel electrodes 9*a* are formed (specifically, the storage capacitors 70 are formed so as to be in light-shielding regions), it is possible to maintain a larger pixel aperture ratio of the entire electro-optical device and to display bright images.

Specifically, the lower electrodes 71 are made of, for example, a conductive polysilicon film and function as the pixel potential side capacitance electrodes. The lower electrodes 71 may be made of a single layer film or a multi-layer film including a metal or an alloy. The lower electrodes 71 function as the pixel potential side capacitance electrodes and relay-connect the pixel electrode 9*a* to the high-concentration drain regions 1*e* of the TFTs 30. Furthermore, the relay connection mentioned here is performed through the relay electrodes 719.

The capacitance electrodes 300 function as the fixed potential side capacitance electrodes of the storage capacitors 70. According to the present exemplary embodiment, in order to make the capacitance electrodes 300 have the fixed potential, the capacitance electrodes 300 may be electrically connected to the capacitance wiring lines 400 (will be mentioned later) of the fixed potential. The capacitance electrodes 300 are made of a metallic element including at least one among refractory metals, such as Ti, Cr, W, Ta, and Mo, an alloy, metal silicide, poly silicide, result obtained by laminating the above, or a tungsten silicide. Therefore, the capacitance electrodes 300 intercept the light incident on the TFTs from above.

As illustrated in FIG. 6, the dielectric films 75 are made of a silicon oxide film, such as relatively thin high temperature oxide (HTO) films and low temperature oxide (LTO) films of about 5 to 20 nm or a silicon nitride film. In order to increase the storage capacitors 70, the thinner the dielectric films 75, the better as long as it is possible for them to be reliable.

In the present exemplary embodiment, as illustrated in FIG. 6, the dielectric film 75 has a two-layered structure in which a lower layer is a silicon oxide film 75a and an upper layer is a silicon nitride film 75b. The silicon nitride film 75b on the upper layer is patterned so as to be slightly larger than or equal to the lower electrode 71 of the pixel potential capacitance electrode to be in a light-shielding region (a non-aperture region).

Also, in the present exemplary embodiment, the dielectric film 75 is two layered. However, the dielectric film 75 may have a three-layered structure composed of a silicon oxide film, a silicon nitride film, and a silicon oxide film or more than a three-layered structure. The dielectric film 75 may be single layered. $Al_2O_3$, $Ta_2O_5$, and $HfO_2$ as well as the silicon nitride may be used.

Laminated Structure: Structure between Second Layer and Third Layer

The first interlayer insulating film 41 made of a silicate glass film, such as non-silicate glass (NSG), phosphor silicate glass (PSG), boron silicate glass (BSG), and boron phosphor silicate glass (BPSG), the silicon nitride film, the silicon oxide film, or, the NSG, is formed on the TFTs 30 to the gate electrodes 3a and the relay electrodes 719 and under the storage capacitors 70.

The contact holes 81 to electrically connect the high-concentration source regions 1d of the TFTs 30 to the later-mentioned data lines 6a are formed in the first interlayer insulating film 41 so as to pass through the later-mentioned second interlayer insulating film 42. Also, in the first interlayer insulating film 41, contact holes 83 to electrically connect the high-concentration drain regions 1e of the TFTs 30 to the lower electrodes 71 that constitute the storage capacitors 70 are formed. Moreover, in the first interlayer insulating film 41, contact holes 881 to electrically connect the lower electrodes 71 as the pixel potential side capacitance electrodes that constitute the storage capacitors 70 to the relay electrodes 719 are formed. Furthermore, in the first interlayer insulating film 41, contact holes 882 to electrically connect the relay electrodes 719 to the later-mentioned second relay electrodes 6a2 are formed so as to pass through the later-mentioned second interlayer insulating film.

Laminated Structure: Structure of Fourth Layer

In the fourth layer following the above-mentioned third layer, the data lines 6a are provided. As illustrated in FIG. 6, the data line 6a is made of a film having a three-layered structure of an aluminum layer (refer to the reference numeral 41A in FIG. 6), a titan nitride layer (refer to the reference numeral 41 TN in FIG. 6), and a silicon nitride layer (refer to the reference numeral 401 in FIG. 6) in the order from the bottom layer. The silicon nitride film is patterned to be slightly larger than the aluminum layer and the titan nitride layer underneath so as to cover the aluminum layer and the titan nitride layer.

Also, in the fourth layer, relay layers 6a1 used as capacitance wiring lines and the second relay electrodes 6a2 are made of the same film as the data lines 6a. As illustrated in FIG. 5, in a plan view, the relay layers 6a1 and the second relay electrodes 6a2 are not formed so as to be connected to the data lines 6a and to be plane but so as to be separated from each other in the patterning. For example, when attention is paid to the data line 6a on the leftmost side in FIG. 5, on the right side thereof, the substantially rectangular relay layer 6a1 used as the capacitance wiring line is formed. Also, on the right side thereof, the substantially rectangular second relay electrode 6a2 having an area slightly larger than that of the relay layer 6a1 used as the capacitance wiring line is formed.

Furthermore, since the relay layer 6a1 used as the capacitance wiring line and the second relay electrode 6a2 are made of the same film as the data lines 6a, each of the relay layer 6a1 and the second relay electrode 6a2 has a three-layered structure of an aluminum layer, a titan nitride layer, and a plasma nitride layer in the order from the bottom layer.

Laminated Structure: Structure between Third Layer and Fourth Layer

A second interlayer insulating film 42 made of the silicate glass film, such as NSG, PSG, BSG or BPSG, the silicon nitride film or the silicon oxide film by a plasma CVD method using a TEOS gas is formed on the storage capacitors 70 and under the data lines 6a. In the second interlayer insulating film 42, the above-mentioned contact holes 81 to electrically connect the high-concentration source regions 1d of the TFTs 30 to the data lines 6a are formed. Also, contact holes 801 to electrically connect the relay layers 6a1 used as the capacitance wiring lines to the capacitance electrodes 300 that are the upper electrodes of the storage capacitors 70 are formed. Furthermore, in the second interlayer insulating film 42, the above-mentioned contact holes 882 to electrically connect the second relay electrodes 6a2 to the relay electrodes 719 are formed.

Laminated Structure: Structure of Fifth Layer

In the fifth layer following the fourth layer, the capacitance wiring lines 400 and third relay electrodes 402 are formed. As illustrated in FIG. 5, the capacitance wiring lines 400 extend along the direction X and the direction Y so as to be formed as a matrix. After completing the description of the respective layers having a laminated structure, the capacitance wiring lines 400 will be described in detail.

Laminated Structure: Structure between Fourth Layer and Fifth Layer

A third interlayer insulating film 43 made of the silicate glass film, such as NSG, PSG, BSG or BPSG, the silicon nitride film, or the silicon oxide film by the plasma CVD method using the TEOS gas, is formed on the above-mentioned data lines 6a and under the capacitance wiring lines 400. In the third interlayer insulating film 43, contact holes 803 to electrically connect the above-mentioned capacitance wiring lines 400 to the relay layers 6a1 used as the capacitance wiring lines and contact holes 804 to electrically connect the third relay electrodes 402 to the second relay electrodes 6a2 are formed.

Laminated Structure: Structures of Sixth Layer and between Fifth Layer and Sixth Layer Finally, in the sixth layer, as mentioned above, the pixel electrodes 9a are formed in a matrix. The alignment film 16 is formed on the pixel electrodes 9a (in the present exemplary embodiment, the pixel electrodes 9a are planar, which will be mentioned later). A fourth interlayer insulating film 44 made of the silicate glass film, such as NSG, PSG, BSG or BPSG, the silicon nitride film, the silicon oxide film, or the NSG, is formed under the pixel electrodes 9a. In the fourth interlayer insulating film 44, contact holes 89 to electrically connect the pixel electrodes 9a to the above-mentioned third relay electrodes 402 are formed. The pixel electrodes 9a and the TFTs 30 are electrically connected to each other through the contact holes 89, the third relay layers 402, the above-mentioned contact holes 804, the second relay layers 6a2, the contact holes 882, the relay electrodes 719, the contact holes 881, the lower electrodes 71, and the contact holes 83.

Structure and Operation of Capacitance Wiring Lines

Figure 7:
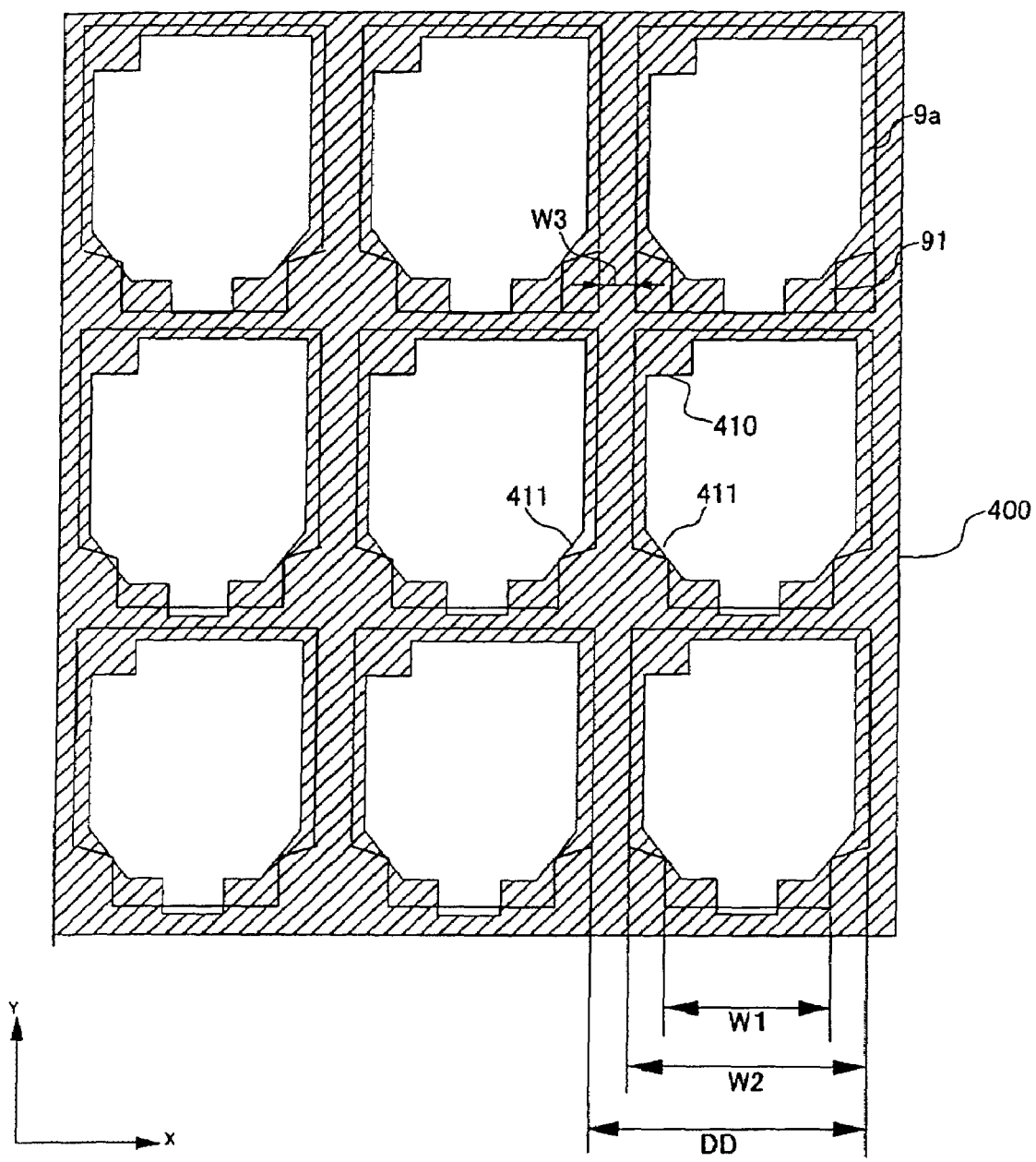
FIG. 7 is a schematic illustrating only capacitance wiring lines and pixel electrodes in FIG. 5.
Figure 8:
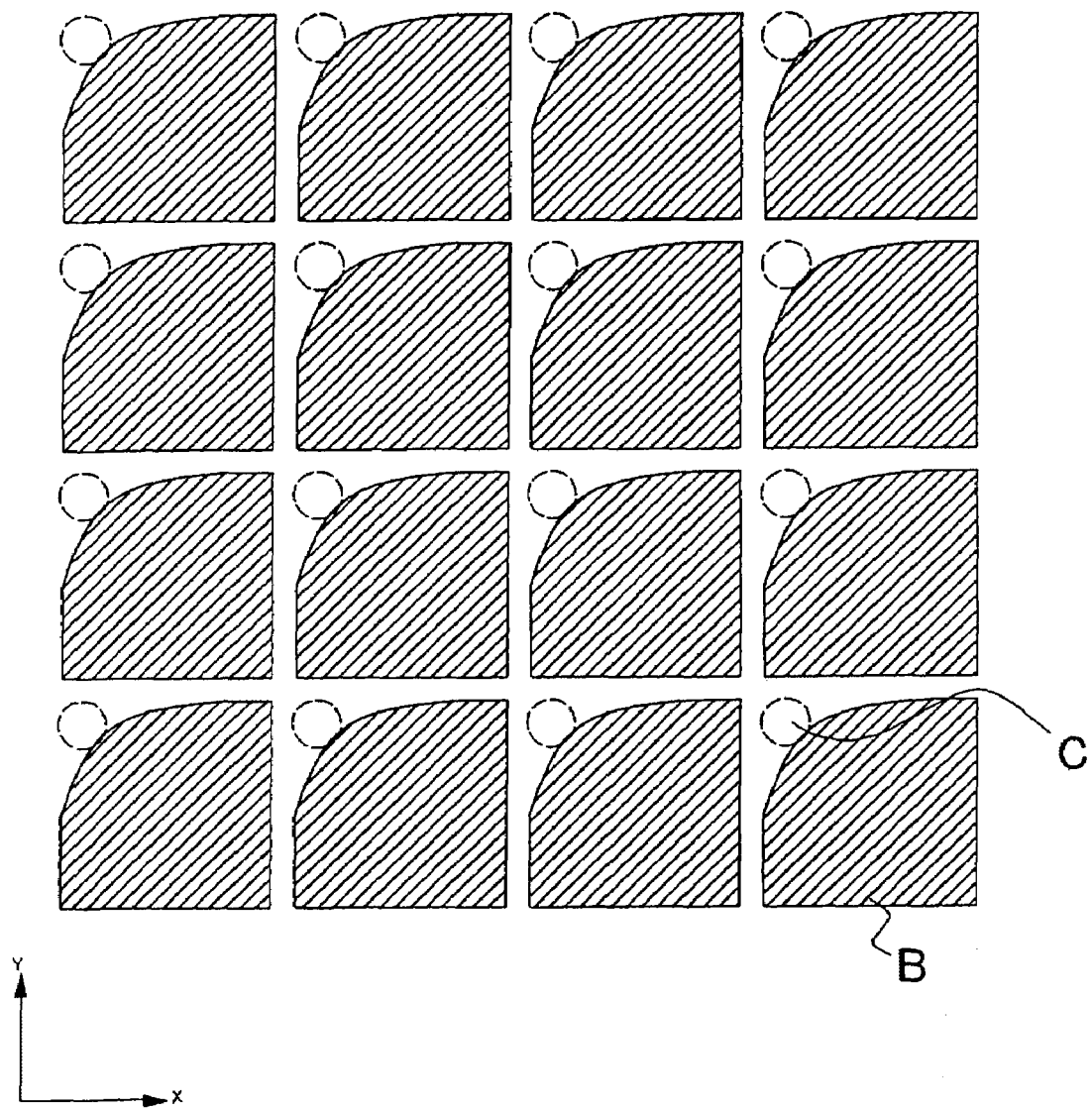
FIG. 8 is a schematic illustrating a type of the light leakage caused by the cutout portions of the pixel electrodes.

The structure and the operation of the capacitance wiring lines 400 mentioned as the components provided in the fifth layer will now be described in detail with reference to FIGS. 7 and 8. Here, FIG. 7 is a schematic illustrating only the capacitance wiring lines and the pixel electrodes among the various components illustrated in FIG. 5. FIG. 8 is a schematic illustrating the aspect of the light leakage caused by the cutout portions of the pixel electrodes.

First, before describing the structure of the capacitance wiring lines 400, the planar shape of the pixel electrodes 9a closely related to the structure of the capacitance wiring lines 400 will now be described.

As illustrated in FIGS. 5 and 7, the pixel electrodes 9a include the cutout portions 91. When the cutout portions 91 do not exist or when the pixel electrodes exist even in the cutout portions 91, in the rectangular pixel electrode in plan view (refer to the dashed lines in the pixel electrode 9a on the right upper end in FIG. 7), the cutout portions 91 according to the present exemplary embodiment are formed so as to cut out two corners sandwiching a short side in the rectangle therebetween.

In the present exemplary embodiment, due to the cutout portions 91, it is possible to reduce the likelihood or prevent the adjacent reverse tilt domains from interacting. Here, the reverse tilt domains are formed by performing one H inversion driving in which the pixel electrodes 9a in the respective rows (in the direction X in the drawings) illustrated in FIG. 3, 5, or 7 are alternately positively and negatively driven in an nth field period and, the pixel electrodes 9a in the respective rows are alternately negatively and positively driven, which is contrary to the above in an n+1th field period (the pixel electrodes 9a are driven in the same way). Specifically, in the nth field, the pixel electrodes 9a in the odd rows are positively driven and the pixel electrodes 9a in the even rows are negatively driven and, in the n+1th field, the pixel electrodes 9a in the odd rows are negatively driven and the pixel electrodes 9a in the even rows are positively driven. According to the "one H inversion driving", since an electric field whose polarity is inverted is applied to every pixel electrode 9a, the alignment of the liquid crystal molecules may be easily disturbed. Therefore, in specific regions, some liquid crystal molecules are arranged in the direction inverse to the original direction. The specific regions are the reverse tilt domains. When the cutout portions 91 do not exist, since the distance between the adjacent pixel electrodes 9a, for example, the distance (W3) between the pixel electrode 9a on the right upper end of FIG. 7 and the pixel electrode 9a on the left side thereof becomes smaller, interaction occurs between the reverse tilt domains generated in the pixel electrodes 9a and, for example, the black line display remains in one group of horizontal pixels to deteriorate the quality of images.

However, in the present exemplary embodiment, since it is possible to separate the adjacent pixel electrodes 9a from each other due to the presence of the cutout portions 91, it is possible to reduce or prevent the occurrence of interactions among the reverse tilt domains and to reduce or prevent the deterioration in images.

Also, in the present exemplary embodiment, it is possible to obtain the above-mentioned effects by forming the cutout portions 91 and to display images without deteriorating the brightness compared with the state in which the cutout portions 91 do not exist. This is because, as illustrated in FIG. 5, the cutout portions 91 are provided in the minimum necessary regions where the reverse tilt domains may be generated so that the pixel electrodes 9a are separated from each other by a predetermined distance only in the corresponding portions so as not to reduce the areas of the pixel electrodes 9a, which serve as light-transmitting regions, more than required.

Also, in the present exemplary embodiment, specifically, for example, when a pixel pitch DD is 14 [μm] and the width W1 of the portion excluding the cutout portions 91 of the pixel electrodes 9a in the direction X is 11.0 to 11.5 [μm], the width W2 of the pixel electrodes 9a in the horizontal direction is preferably about 12.0 to 12.5 [μm] (refer to FIG. 7 with respect to DD, W1, and W2). Furthermore, in this case, in the portions where the cutout portions 91 do not exist, the distance between the adjacent pixel electrodes 9a is in the order of DD−W2=1.5 to 2.0 [μm] (=W3, refer to FIG. 7). In the portions where the cutout portions 91 exist, the between the adjacent pixel electrodes 9a distance is in the order of (DD−W1)/2=2.5 to 3.0 [μm]. When such a relationship is met, it is possible to achieve the above-mentioned effects to the maximum.

While the pixel electrodes 9a have the cutout portions 91 as mentioned above, according to the present exemplary embodiment, the capacitance wiring lines 400 have the following structure. First, as illustrated in FIGS. 5 and 7, the capacitance wiring lines 400 are formed as a matrix so as to extend to the directions X and Y (also, in FIGS. 5 and 7, the regions where the wiring lines 400 are formed are hatched). In the capacitance wiring lines 400, the portions that extend to the direction Y are wider than the data lines 6a so as to cover the data lines 6a. Also, in the portions that extend to the direction X in the drawings, in order to secure the regions where the third relay electrodes 402 are formed, the cutout portion is formed so as to correspond to the vicinity of the center of one side of each pixel electrode 9a. Here, as illustrated in FIG. 6, the above-mentioned third relay electrodes 402 are made of the same film as the capacitance wiring lines 400. As illustrated in FIG. 6, the third relay electrodes 402 relay electrical connection between the second relay electrodes 6a2 and the pixel electrodes 9a through the contact holes 804 and 89. Therefore, the image signals supplied through the data lines 6a are supplied to the pixel electrodes 9a through the contact holes 81, the TFTs 30, the contact holes 83, the storage capacitors 70, the contact holes 881, the relay electrodes 719, the contact holes 882, the second relay electrodes 6a2, the contact holes 804, the third relay electrodes 402, and the contact holes 89 in order. Also, the third relay electrodes 402 and the capacitance wiring lines 400 are not connected to each other in plan view but are separated from each other in the patterning.

In FIGS. 5 and 7, in the corners of the intersections among the capacitance wiring lines 400 that extend to the directions X and Y, quadrangular portions 410 and triangular portions 411 are provided so as to fill the corresponding corners. Specifically, when attention is paid to one intersection, the quadrangular portion 410 (an example of the "second light-shielding film" according to an aspect of the present invention) is formed in the right lower corner. In the drawings, the triangular portion 411 (an example of the "third light-shielding film" according to an aspect of the present invention) is formed in each of the left upper corner and the right upper corner. The quadrangular portions 410 and the triangular portions 411 are made of the same film as the capacitance wiring lines 400 and extend from the capacitance wiring lines 400 (that is to say, as parts of the capacitance wiring lines 400). The cutout portions 91 of each pixel electrode 9a are formed in the two corners that define a lower side in the drawing in the rectangle that is the planar shape of the pixel electrode 9a, the quadrangular portion 410 corresponds to the left corner in the drawing between the two corners that define the upper side in the drawing, which faces the lower side in the drawing. The triangular portions 411 correspond to the positions at which the cutout portions 91 formed in the pixel electrodes 9a, and are formed so as to cover the entire cutout portions 91.

Furthermore, each of the above-mentioned capacitance wiring lines 400 and the third relay electrodes 402 has a two-layered structure composed of a lower aluminum layer and an upper titan nitride layer. The lower aluminum layer has a relatively superior light-reflecting performance. The upper titan nitride layer has a relatively superior light-absorbing performance. Whereby the capacitance wiring lines 400 and the third relay electrodes 402 function as the light-shielding films.

The capacitance wiring lines 400 extend from the image display region 10a in which the pixel electrodes 9a are arranged to the periphery thereof and are electrically connected to a controlled potential source to have fixed potential. The capacitance wiring lines 400 are electrically connected to the capacitance wiring line relay layers 6a1 through the contact holes 803 and are electrically connected to the capacitance electrodes 300 that are one side electrodes of the storage capacitors 70 through the contact holes 801. As mentioned above, the capacitance wiring lines 400 supply the fixed potential to the capacitance electrodes 300.

Effects of Electro-Optical Device

As mentioned above, according to the quadrangular portions 410 and the triangular portions 411 in the capacitance wiring lines 400 corresponding to the cutout portions 91 in the pixel electrodes 9a, it is possible to obtain the following effects.

First, according to the electro-optical device of the present exemplary embodiment, it is possible to reduce or prevent the occurrence of the light leakage caused by the cutout portions 91 of the pixel electrodes 9a. The light leakage is observed as illustrated in FIG. 8. Here, FIG. 8 is a schematic illustrating the shapes of the light leakage observed when the cutout portions 91 are provided in the pixel electrodes 9a. As illustrated in FIG. 8, when the cutout portions 91 illustrated in FIGS. 5 and 7 are formed in the pixel electrodes 9a, though the specific causes are not known, relatively strong light leakage C occurs in the left upper portion in the drawing of each pixel electrode 9a. When such light leakage C occurs, for example, when it is desired to display the entire surface in black B, it is not possible (that is, the quality of images deteriorates). Refer to FIG. 8. However, in the present exemplary embodiment, the quadrangular portions 410 are formed as parts of the capacitance wiring lines 400. Therefore, according to the present exemplary embodiment, it is possible to intercept the travel of light caused by the light leakage by the quadrangular portions 410 to reduce or prevent the deterioration of the quality of images. As mentioned above, according to the present exemplary embodiment, it is possible to reduce or prevent the deterioration of images due to the reverse tilt domains by forming the cutout portions 91 in the pixel electrodes 9a and by reducing or preventing the light leakage due to the cutout portions 91.

According to the present exemplary embodiment, although it is possible to obtain such effects, the quadrangular portions 410 cover only the left upper corner in the drawing of every pixel electrode 9a and do not randomly cover the regions where the pixel electrodes 9a are formed and which serve as light-transmitting regions over a wide area. Therefore, the brightness of images is not greatly sacrificed compared with the related art. In short, according to the present exemplary embodiment, it is still possible to reduce or prevent the occurrence of the light leakage and to display bright images.

As a second effect of the electro-optical device according to the present exemplary embodiment, the quadrangular portions 410 and the triangular portions 411 are formed as parts of the capacitance wiring lines 400. Therefore, even if the light leakage caused by the cutout portions 91 occurs in unexpected positions excluding the positions illustrated in FIG. 8, it is possible to reduce or prevent the occurrence of the light leakage beforehand. According to the triangular portions 411, it is possible to reduce or prevent light from being incident on the semiconductor layers 1a of the TFTs 30 beforehand. Therefore, according to the present exemplary embodiment, it is possible to reduce or prevent light leakage current from being generated in the semiconductor layers 1a and to reduce or prevent flickers from being generated on images due to the incidence of light on the semiconductor layers 1a beforehand. In particular, according to the present exemplary embodiment, since the TFTs 30 are arranged so as to correspond to the intersections among the formed as a matrix capacitance wiring lines 400 (refer to FIGS. 4 and 5), when the triangular portions 411 do not exist, it is likely that the light that passes through the vicinity of the corners in the intersections be incident on the semiconductor layers 1a. Therefore, it is possible to more effectively obtain the above-mentioned effects. Furthermore, since the triangular portions 411 are formed so as to cover the entire cutout portions 91 of the pixel electrodes 9a, it is possible to block the light that leaks out through the cutout portions 91, that is, the portions in which the pixel electrodes 9a are not formed.

It has been separately described that the quadrangular portions 410 are provided so as to cope with the "light leakage" and that the triangular portions 411 are provided so as to reduce or prevent light from being incident on the semiconductor layers 1a. However, such descriptions are for the sake of convenience. That is, the quadrangular portions 410 reduce or prevent the "light leakage" caused by the cutout portions 91 illustrated in FIG. 8. However, it is apparent that the quadrangular portions 410 can perform the above-mentioned function (of preventing light from being incident on the semiconductor layers 1a) of the triangular portions 411. There is no functional difference between the quadrangular portion 410 and the triangular portion 411. In this connection, in the present exemplary embodiment, the quadrangular portions 410 and the triangular portions 411 are separately denoted and the specific shapes thereof are different from each other. However, this is also only for convenience of description. That is, the shapes that fill the corners of the intersections among the capacitance wiring lines 400 may be triangular or quadrangular. The "second light-shielding film" and the "third light-shielding film" according to an aspect of the present invention may have different shapes as in the present exemplary embodiment or may be completely the same. Also, the specific shapes of the "third light-shielding film" may vary in accordance with the positions at which the third light-shielding film is formed.

According to a third effect of the electro-optical device of the present exemplary embodiment, the capacitance wiring lines 400 are arranged between the pixel electrodes 9a and the data lines 6a in the laminated structure on the TFT array substrate 10 (refer to FIG. 6) and have the fixed potential to reduce or prevent the occurrence of capacitive coupling between the pixel electrodes 9a and the data lines 6a. Therefore, according to the present exemplary embodiment, it is possible to display high quality images without generating color phase irregularity along the data lines 6a. Also, according to the present exemplary embodiment, the capacitance wiring lines 400 are made of the aluminum film and the titan nitride film as mentioned above and function as the light-shielding films. However, as mentioned above, when one component has two functions, compared with the case in which the capacitance wiring lines 400 and the light-shielding films are separately formed, it is possible to simplify the structure of the electro-optical device and to reduce manufacturing costs.

Also, the capacitance wiring lines 400 according to the present exemplary embodiment functions as wiring lines to supply the fixed potential to the capacitance electrodes 300 that partially constitute the storage capacitors 70 (refer to FIG. 6). As mentioned above, the capacitance wiring lines 400 according to the present exemplary embodiment have three functions, one as shielding layers to reduce or prevent the occurrence of the capacitive coupling between the pixel electrodes 9a and the data lines 6a, another to supply the fixed potential to the capacitance electrodes 300 of the storage capacitors 70, and the third as light-shielding films (including the function of preventing light from being incident on the TFTs 30) made of the same film as the triangular portions 410 to prevent the "light leakage" caused by the cutout portions 91. Therefore, it is possible to simplify the structure of the electro-optical device and to reduce the manufacturing costs.

Also, according to the present exemplary embodiment, the pixel electrodes 9a are formed in the regions excluding the regions where the formed as a matrix capacitance wiring lines 400 are formed (according to terms of an aspect of the present invention, "so as to exclude the formed as a matrix shapes"). As apparent from FIGS. 5 and 7, according to the present exemplary embodiment, since the respective sides that constitute the pixel electrodes 9a overlap parts of the capacitance wiring lines 400 in plan view, it cannot be mentioned that the pixel electrodes 9a exclude the formed as a matrix shapes in the strict sense, however, are in the range of excluding the formed as a matrix shapes. As mentioned above, "so as to exclude" according to an aspect of the present invention includes the case in which parts of the capacitance wiring lines 400 overlap parts of the pixel electrodes 9a.

Also, according to the present exemplary embodiment, the cutout portions 91 are formed so as to correspond to the two corners that define the lower side in the drawing of each pixel electrode 9a. The quadrangular portion 410 that is a part of the capacitance wiring line 400 is formed in the left corner between the two corners that define the upper side in the drawing, which faces the lower side. However, the present invention is not restricted to this.

Figure 9:
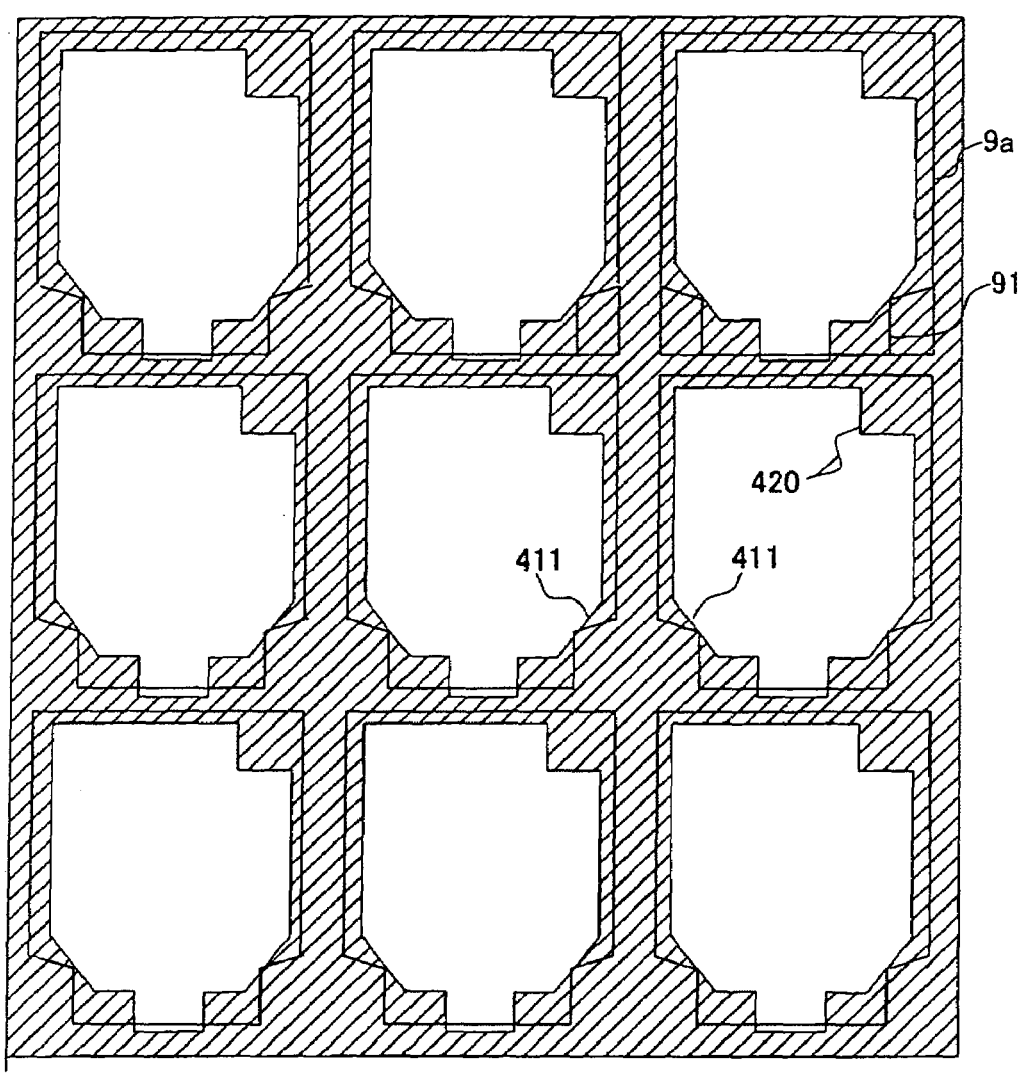
FIG. 9 is a schematic, similar to FIG. 7, illustrating that the positions at which quadrangular portions that are parts of the capacitance wiring lines are formed are different from those of FIG. 7.

According to the research of the present inventor, it is found that the positions at which the light leakage C mentioned with reference to FIG. 8 are affected by the directions in which the liquid crystal molecules in the liquid crystal layer 50 interposed between the TFT array substrate 10 and the counter substrate 20 rotates. The type of the light leakage C of FIG. 8, which has already been described, is observed when the liquid crystal molecules in the liquid crystal layer 50 rotate to the left. When the liquid crystal molecules rotate to the right, the light leakage occurs in the position reverse to the position of FIG. 8 (that is, on the right upper position of each pixel). Therefore, in this case, according to the arrangement illustrated in FIGS. 5 and 7, it is not possible to effectively prevent the deterioration of images due to the light leakage. Therefore, according to an aspect of the present invention, it is possible to separately change the positions at which the quadrangular portions are formed in accordance with the rotation of the liquid crystal molecules to the left and the rotation of the liquid crystal molecules to the right. For example, when the liquid crystal molecules rotate to the right, since the light leakage occurs in the position reverse to the position of FIG. 8 as mentioned above, for example, the electro-optical device having the arrangement illustrated in FIG. 9 may be formed. The positions at which the cutout portions 91 (and the triangular portions 411) are formed in FIG. 9 are identical with the positions in FIG. 7. However, the quadrangular portions 420 of FIG. 9 are formed so that the right and left are reversed with those of the quadrangular portions 410 of FIG. 7. Therefore, it is possible to reduce or prevent the occurrence of the light leakage as mentioned above.

Figure 10:
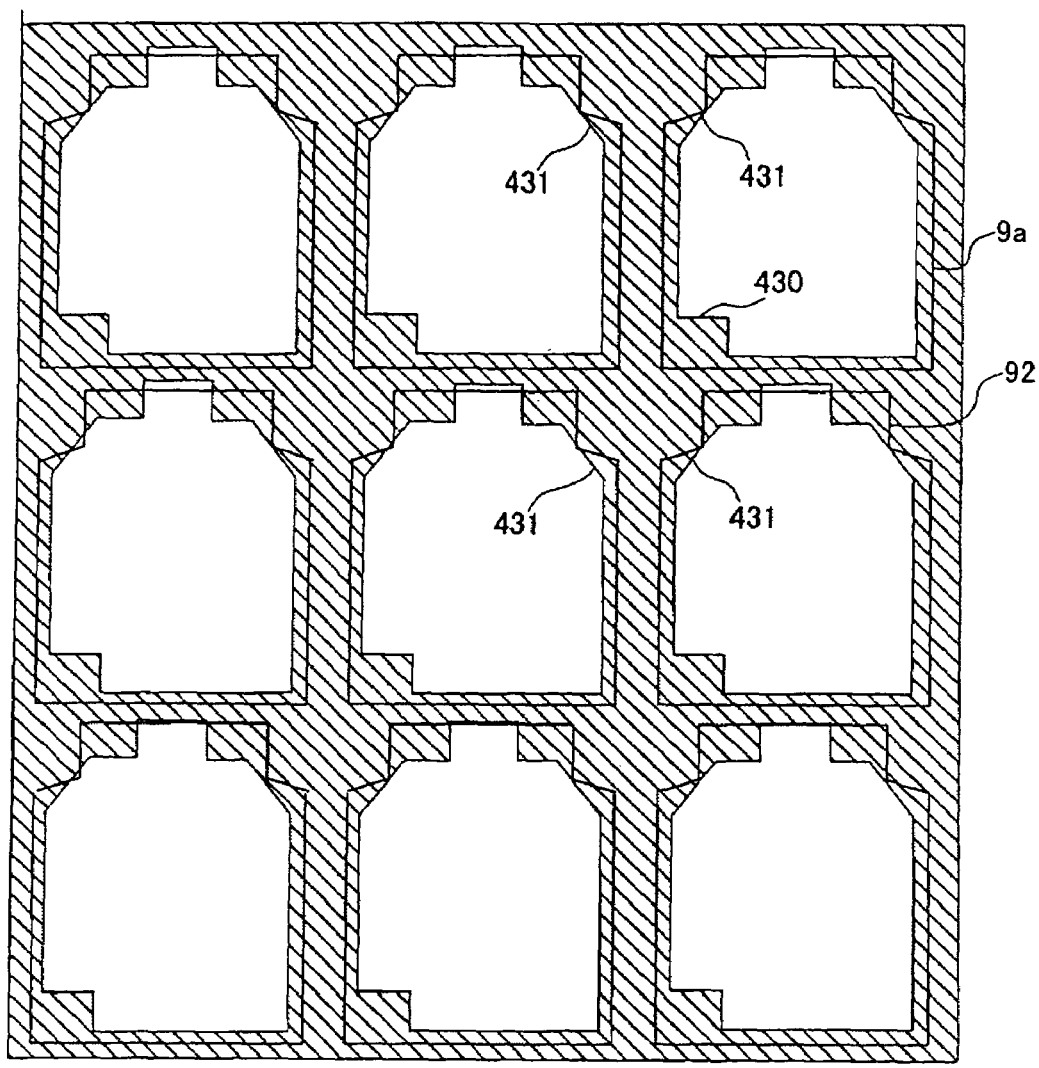
FIG. 10 is a schematic, similar to FIG. 7, illustrating that the positions at which quadrangular portions and triangular portions that are parts of the capacitance wiring lines, and the cutout portions of the pixel electrodes are formed are different from those of FIG. 7 (upside-down drawing of FIG. 7)

Also, since the light leakage occurs in the cutout portions formed in the pixel electrodes 9a, as illustrated in FIG. 10, unlike in FIGS. 5 and 7, when cutout portions 92 of the pixel electrodes 9a are formed so as to correspond to the two corners that define the upper side in the drawing, the quadrangular portions 430 of the capacitance wiring lines 400 may be formed so as to correspond to the left upper corners in the drawing in the intersections of the capacitance wiring lines 400 as illustrated in the drawing. Furthermore, in FIG. 10, in accordance with the changes in the positions at which the quadrangular portions 430 are formed, the positions at which the triangular portions 431 are formed change as apparent from comparison with FIG. 7.

Figure 11:
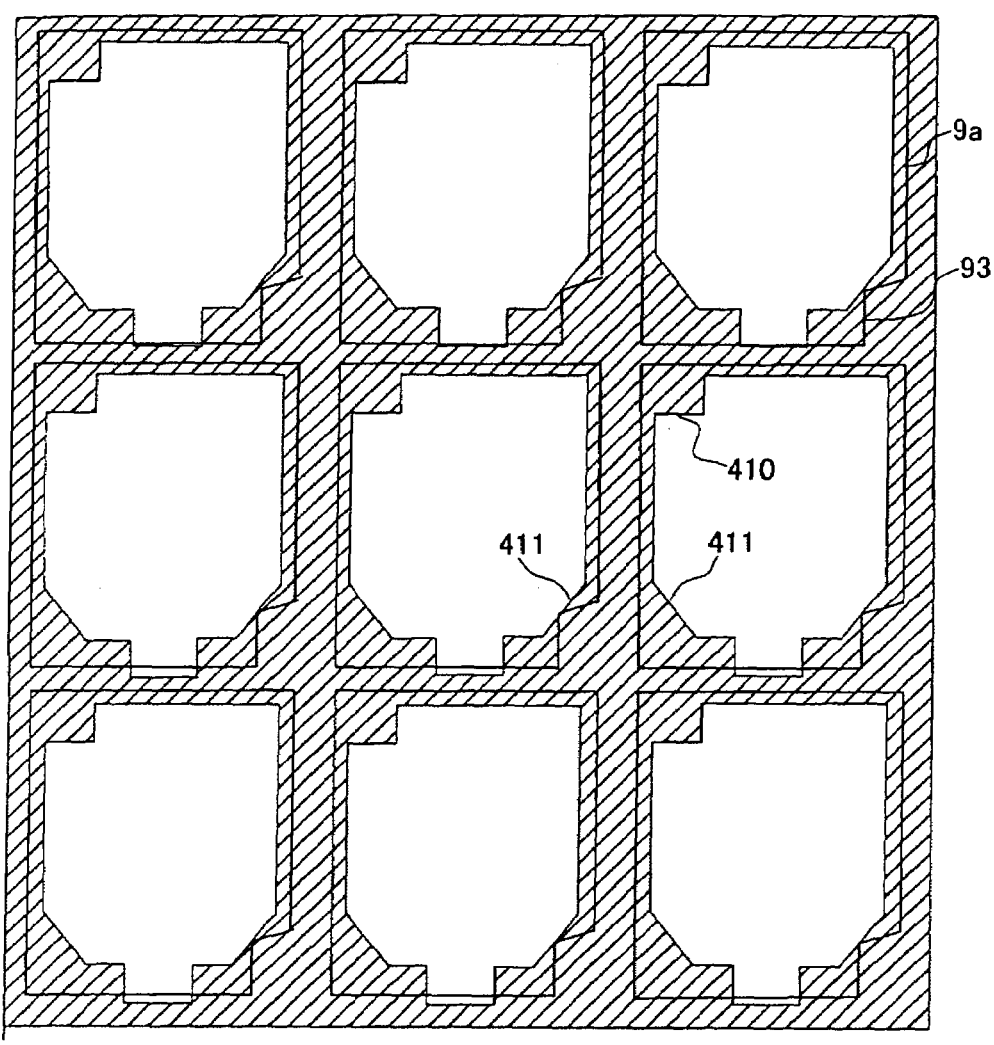
FIG. 11 is a schematic, similar to FIG. 7, illustrating that the positions at which the cutout portions of the pixel electrodes are formed are different from those of FIG. 7.

The shapes of the "cutout portions" that are formed in the pixel electrodes 9a are not restricted to the shapes illustrated in FIGS. 7 to 10. For example, as illustrated in FIG. 11, each cutout portion 93 may be formed in one of the two corners that define the lower side in the drawing of each pixel electrode 9a. Even in this case, since it is possible to increase the distance between the adjacent pixel electrodes 9a by forming the cutout portions 93, it is possible to reduce or prevent the deterioration of images due to the reverse tilt domains. Even in such a structure, it is possible to obtain the same effects when the quadrangular portions 410 and the triangular portions 411 are formed. Also, in FIG. 11, the quadrangular portions 410 and the triangular portions 411 are formed in the positions identical with the positions of FIG. 7. However, it is likely that the "cutout portions" are changed to cause another type of "light leakage". Therefore, in such a case, the positions at which the triangular portions 411 as well as the positions at which the quadrangular portions 410 may be appropriately changed.

According to an aspect of the present invention, various modifications may be made based on the arrangements of the cutout portions of the pixel electrodes and the quadrangular portions without departing from the scope of the present invention.

Electronic Apparatus

Next, the general structure, in particular, the optical structure of the projection color display apparatus that is an example of the electronic apparatus that uses the above-mentioned electro-optical device as a light valve will be described. Here, FIG. 12 is a schematic of the projection color display apparatus.

Figure 12:
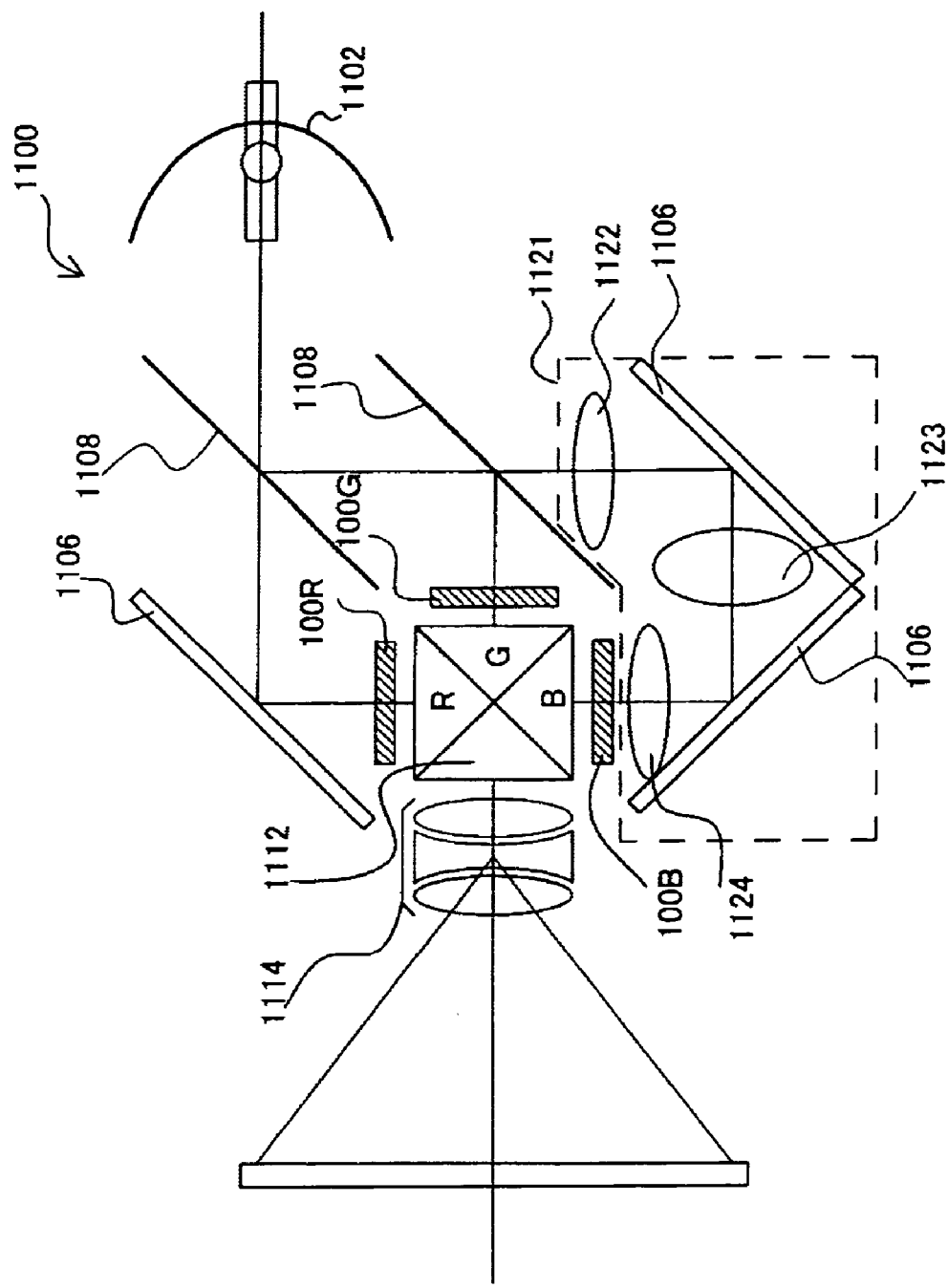
FIG. 12 illustrates a schematic of a projection display apparatus in which an electro-optical device according to the present exemplary embodiment is used as a light valve.

In FIG. 12, a liquid crystal projector 1100 that is an example of the projection color display apparatus according to the present exemplary embodiment is formed of a projector in which three liquid crystal modules including a liquid crystal device in which driving circuits are mounted on the TFT array substrate are provided so as to be used as RGB light valves 100R, 100G, and 100B. In the liquid crystal projector 1100, when projection light is emitted from a lamp unit 1102 of a white light source, such as a metal halide lamp, the projection light is divided into light components R, G, and B corresponding to the three primary colors of RGB by three mirrors 1106 and two dichroic mirrors 1108 and the light components R, G, and B are guided to light valves 100R, 100G, and 100B of the respective colors. At this time, in particular, the light B is guided through a relay lens system 1121 composed of an incidence lens 1122, a relay lens 1123, and an emission lens 1124 in order to reduce or prevent the optical loss due to a long light path. The light components corresponding to the three primary colors that are respectively modulated by the light valves 100R, 100G, and 100B are synthesized by a dichroic prism 1112 and are projected to a screen 1120 through a projector lens 1114 as color images.

While this invention has been particularly shown and described with reference to exemplary embodiments thereof, it will be understood by those skilled in the art that various changes in form and details may be made therein without departing from the spirit and scope of the invention. The electro-optical device, the electronic apparatus, and the projection display apparatus that accompany such changes are included in the technical scope of the present invention.

What is claimed is:

1. An electro-optical device, comprising:
   a substrate;
   a first data line formed above the substrate;
   a second data line extending substantially parallel to the first data line;
   a first scanning line extending perpendicular to the first and second data lines so as to intersect the first and second data lines;
   a second scanning line extending parallel to the first scanning line;
   a switching element electrically connected to corresponding ones of the first and second data lines and the first and second scanning lines;
   a counter substrate disposed in opposition with the substrate;
   a liquid crystal layer including a twisted nematic liquid crystal;
   pixel electrodes provided in correspondence with the switching elements, each pixel electrode including:
   a first side extending substantially parallel to the data lines,
   a second side extending substantially parallel to the scanning lines and substantially perpendicular to the first side,
   a third side extending substantially parallel to the first side,
   a fourth side extending substantially perpendicular to the first side,
   a first corner formed with a substantially 90° angle at the intersection between the first side and the second side;
   a second corner formed with a substantially 90° angle at the intersection between the second side and the third side;
   a third corner protruding in-board with relation to an imaginary right-angle corner formed where an imaginary extension of the third side intersects with an imaginary extension of the fourth side;
   a fourth corner protruding in-board with relation to an imaginary right-angle corner formed where an imaginary extension of the fourth side intersects with an imaginary extension of the first side;
   a light-shielding film that extends along the data lines and the scanning lines, the light-shielding film having a lattice shape, the light-shielding film including:
   a first corner portion that covers the first corner of the pixel electrode, the first corner portion including a substantially right-angle corner that protrudes away from the first corner of the pixel electrode so that the right-angle corner of the first corner portion is substantially symmetrical with the first corner of the pixel electrode; and
   a second corner portion that covers the second corner of the pixel electrode, the second corner portion including a substantially right-angle corner that substantially follows the second and third sides of the pixel electrode at the second corner of the pixel electrode.

2. The electro-optical device according to claim 1,
   the first light-shielding films are formed as a first matrix in plan view along both the scanning lines and the data lines,
   the pixel electrodes are arranged in a second matrix so as to exclude the portions formed as the first matrix, and
   the second light-shielding films formed so as to correspond to the corners of the intersections of the first matrix shapes.

3. The electro-optical device according to claim 2,
   each of the second light-shielding films formed so as to correspond to one corner of the intersections,
   the first light-shielding films formed of the same film as the second light-shielding films, and
   third light-shielding films are further provided so as to correspond to at least one of the three corners excluding the one corner among the intersections.

4. The electro-optical device according to claim 3,
   the third light-shielding films formed so as to cover the cutout portions.

5. The electro-optical device according to claim 1,
   the first light-shielding films arranged between the data lines and the pixel electrodes so that the first light-shielding films have fixed potential.

6. The electro-optical device according to claim 1, further comprising:
   storage capacitors, each including above the substrate,
   pixel potential electrodes electrically connected to the switching elements and the pixel electrodes;
   fixed potential electrodes arranged so as to face the pixel potential electrodes; and
   dielectric films arranged between the pixel potential electrodes and the fixed potential electrodes,
   the first light-shielding films supplying fixed potential to the fixed potential electrodes.

7. The electro-optical device according to claim 1,
   each of the first light-shielding films having a laminated structure.

8. An electronic apparatus, comprising:
   the electro-optical device according to claim 1.

9. A projection display apparatus, comprising:
   the electro-optical device according to claim 1;
   a light source;
   an optical system to guide projection light emitted from the light source to the electro-optical device; and
   a projection optical system to project the projection light emitted from the electro-optical device.

10. The electro-optical device according to claim 1, the first and second light-shielding films are to a side of the switching elements that faces a liquid crystal layer.

11. An electro-optical device, comprising:
    a substrate;

a first data line formed above the substrate;
a second data line extending substantially parallel to the first data line;
a first scanning line extending perpendicular to the first and second data lines so as to intersect the first and second data lines;
a second scanning line extending parallel to the first scanning line;
a switching element electrically connected to corresponding ones of the first and second data lines and the first and second scanning lines;
a counter substrate disposed in opposition with the substrate;
a liquid crystal layer including a twisted nematic liquid crystal;
pixel electrodes provided in correspondence with the switching elements, each pixel electrode including:
a first side extending substantially parallel to the data lines,
a second side extending substantially parallel to the scanning lines and substantially perpendicular to the first side,
a third side extending substantially parallel to the first side,
a fourth side extending substantially perpendicular to the first side,
a first corner formed with a substantially 90° angle at the intersection between the first side and the second side;
a second corner formed with a substantially 90° angle at the intersection between the second side and the third side;
a third corner protruding in-board with relation to an imaginary right-angle corner formed where an imaginary extension of the third side intersects with an imaginary extension of the fourth side;
a fourth corner protruding in-board with relation to an imaginary right-angle corner formed where an imaginary extension of the fourth side intersects with an imaginary extension of the first side;
a light-shielding film that extends along the data lines and the scanning lines, the light-shielding film having a lattice shape, the light-shielding film including:
a first corner portion that covers the first corner of the pixel electrode, the first corner portion including a substantially right-angle corner that substantially follows the first and second sides of the pixel electrode at the first corner of the pixel electrode; and
a second corner portion that covers the second corner of the pixel electrode, the second corner portion including a substantially right-angle corner that protrudes away from the second corner of the pixel electrode so that the right-angle corner of the second corner portion is substantially symmetrical with the second corner of the pixel electrode.

12. The electro-optical device according to claim 11, the cutout portions formed so as to cut out at least one of the two corners that define any one side of the rectangles, and
each of the second light-shielding films formed so as to correspond to any one of the two corners that define the side that faces the above-mentioned one side.

13. The electro-optical device according to claim 2, the first and second light-shielding films are to a side of the switching elements that faces a liquid crystal layer.

14. An electro-optical device, comprising:
a substrate;
a first data line formed above the substrate;
a second data line extending substantially parallel to the first data line;
a first scanning line extending perpendicular to the first and second data lines so as to intersect the first and second data lines;
a second scanning line extending parallel to the first scanning line;
a switching element electrically connected to corresponding ones of the first and second data lines and the first and second scanning lines;
a counter substrate disposed in opposition with the substrate;
a liquid crystal layer including a twisted nematic liquid crystal;
pixel electrodes provided in correspondence with the switching elements, each pixel electrode including:
a first side extending substantially parallel to the data lines,
a second side extending substantially parallel to the scanning lines and substantially perpendicular to the first side,
a third side extending substantially parallel to the first side,
a fourth side extending substantially perpendicular to the first side,
a first corner protruding in-board with relation to an imaginary right-angle corner formed where an imaginary extension of the first side intersects with an imaginary extension of the second side;
a second corner protruding in-board with relation to an imaginary right-angle corner formed where an imaginary extension of the second side intersects with an imaginary extension of the third side;
a third corner formed with a substantially 90° angle at the intersection between the third side and the fourth side;
a fourth corner formed with a substantially 90° angle at the intersection between the fourth side and the first side;
a light-shielding film that extends along the data lines and the scanning lines, the light-shielding film having a lattice shape, the light-shielding film including:
a first corner portion that covers the third corner of the pixel electrode, the first corner portion including a substantially right-angle corner that substantially follows the third and fourth sides of the pixel electrode at the third corner of the pixel electrode; and
a second corner portion that covers the fourth corner of the pixel electrode, the second corner portion including a substantially right-angle corner that protrudes away from the fourth corner of the pixel electrode so that the right-angle corner of the second corner portion is substantially symmetrical with the fourth corner of the pixel electrode.

* * * * *